(12) United States Patent
Sato

(10) Patent No.: US 6,456,461 B1
(45) Date of Patent: Sep. 24, 2002

(54) THIN-FILM MAGNETIC HEAD HAVING IMPROVED ACCURACY IN SETTING GAP DEPTH POSITION

(75) Inventor: Kiyoshi Sato, Niigata-ken (JP)

(73) Assignee: Alps Electric Co., LTD, Tokyo (JP)

( * ) Notice: Subject to any disclaimer, the term of this patent is extended or adjusted under 35 U.S.C. 154(b) by 0 days.

(21) Appl. No.: 09/532,941

(22) Filed: Mar. 22, 2000

(30) Foreign Application Priority Data

Mar. 24, 1999 (JP) ............................................. 11-080552

(51) Int. Cl.⁷ ............................................... G11B 5/147
(52) U.S. Cl. ........................................................ 360/126
(58) Field of Search .................................. 360/126, 125, 360/110, 317, 119, FOR 213

(56) References Cited

U.S. PATENT DOCUMENTS

| | | | | |
|---|---|---|---|---|
| 5,267,112 A | * | 11/1993 | Batra et al. ................... | 360/119 |
| 5,452,164 A | | 9/1995 | Cole et al. .................... | 360/317 |
| 5,649,351 A | | 7/1997 | Cole et al. ................. | 29/603.14 |
| 5,652,687 A | | 7/1997 | Chen et al. ................... | 360/126 |
| 5,802,700 A | | 9/1998 | Chen et al. ............... | 29/603.14 |
| 6,151,193 A | * | 11/2000 | Terunuma et al. ........... | 360/126 |
| 6,169,642 B1 | * | 1/2001 | Mino et al. .................. | 360/126 |
| 6,188,544 B1 | * | 2/2001 | Mino .......................... | 360/126 |
| 6,252,748 B1 | * | 6/2001 | Yamanaka et al. .......... | 360/317 |
| 6,282,056 B1 | * | 8/2001 | Feng et al. .................. | 360/126 |

* cited by examiner

Primary Examiner—Robert S. Tupper
Assistant Examiner—Julie Anne Watko
(74) Attorney, Agent, or Firm—Brinks Hofer Gilson & Lione

(57) ABSTRACT

A thin-film magnetic head includes an upper core layer and a lower core layer, extending from a back region to a magnetic pole region, and ends thereof being disposed at a medium-opposing face; a gap layer disposed in the magnetic pole region between the upper core layer and the lower core layer; a groove formed in an insulating layer formed on the lower core layer, the groove extending from the medium-opposing face in the magnetic pole region to the back region; and a lower magnetic pole layer, the gap layer, and an upper magnetic pole layer in the groove. In the thin-film magnetic head, the lower magnetic pole layer and the lower core layer are connected to each other, the upper magnetic pole layer and the upper core layer are connected to each other, and the groove comprises a groove body portion which has a cross-sectional size approximately equivalent to that of an opening of the groove at the medium-opposing face and extends in the magnetic pole region, and a groove-continuing portion which continues from the groove body portion and extends in the back region.

19 Claims, 22 Drawing Sheets

THIN-FILM MAGNETIC HEAD HAVING IMPROVED ACCURACY IN SETTING GAP DEPTH POSITION

BACKGROUND OF THE INVENTION

1. Field of the Invention

The present invention relates to thin-film magnetic heads and manufacturing methods therefore, and more particularly, relates to a thin-film magnetic head for a track width of not more than 1 μm and a suitable technique for a manufacturing method therefor.

2. Description of the Related Art

FIG. 36 is a perspective view showing a magnetic head 150 provided with a conventional hybrid thin-film magnetic head in a slider, and FIG. 37 is a cross-sectional view of the magnetic head 150 shown in FIG. 36.

This floating-type magnetic head 150, as shown in FIG. 36, is primarily composed of a slider 151 and a hybrid thin-film magnetic head 157 provided in the slider 151. Reference numeral 155 indicates a leading side of the slider 151 which is an upstream side of the direction of motion of a magnetic reading medium, and reference numeral 156 indicates a trailing side which is a downstream side of the direction of motion of the magnetic recording medium. In a medium-opposing face 152 of the slider 151 opposing the magnetic recording medium, rails 151a, 151b, and 151a, are formed, and air grooves 151c and 151c are formed between the individual rails.

The hybrid thin-film magnetic head 157 is provided at a side wall 151d at the trailing side 156 of the slider 151.

FIG. 38 is a perspective view showing the hybrid thin-film magnetic head 157.

As shown in FIGS. 37 and 38, the hybrid thin-film magnetic head 157 is composed of a magnetoresistive (MR) magnetic head h1 provided with a magnetoresistive element and a thin-film magnetic head h2 as a writing head, both of which are formed in a layered structure on the side wall 151d of the slider 151.

As shown in FIGS. 37 and 38, the MR magnetic head h1 is composed of a lower shield layer 163 composed of a magnetic alloy and formed on the side wall 151d of the slider 151, a reading gap layer 164 formed on the lower shield layer 163, a magnetoresistive element 165, a part of which is exposed at the medium-opposing face 152, an upper gap layer 166 covering the magnetoresistive element 165 and the reading gap layer 164, and an upper shield layer 167 covering the upper gap layer 166.

The upper shield layer 167 is also used as a lower core layer for the thin-film magnetic head h2.

The MR magnetic head hi described above is used as a reading head, in which resistance of the magnetoresistive element 165 changes upon application of a minute leakage magnetic field from the magnetic recording medium, and voltage changes in accordance with these resistance changes are read as read signals of the magnetic recording medium.

The thin-film magnetic head h2 is composed of a lower core layer (the upper shield layer) 167, a gap layer 174 formed on the lower core layer 167, a coil 176 formed on the gap layer 174 in a back region Y, an upper insulating layer 177 covering the coil 176, and an upper core layer 178 joined to the gap layer 174 in a magnetic pole region X and to the lower core layer 167 in the back region Y.

The coil 176 is patterned in a planar spiral form. A base terminal portion 178b of the upper core layer 178 is magnetically coupled to the lower core layer 167 approximately at the center of the coil 176.

A protective layer 179 composed of alumina or the like is formed on the upper core layer 178.

The lower core layer 167, the gap layer 174, and the upper core layer 178 are disposed from the back region Y to the magnetic pole region X in the hybrid thin-film magnetic head 157, and are exposed at the medium-opposing face 152. At the medium-opposing face 152, the upper core layer 178 and the lower core layer 167 oppose each other with the gap layer 174 therebetween so as to form a magnetic gap.

As shown in FIG. 37, the magnetic pole region X is a region in which the upper core layer 178 and the lower core layer 167 oppose each other only with the gap layer 174 therebetween in the vicinity of the medium-opposing face 152, and the back region Y is a region other than the magnetic pole region X.

The thin-film magnetic head h2 described above is used as a writing head, in which, upon application of a writing current to the coil 176, a magnetic flux is generated in the upper core layer 178 and the lower core layer 167 by this writing current, the magnetic flux leaking from the magnetic gap generates a leakage magnetic field, and write signals are written by magnetizing the magnetic recording medium with a leakage magnetic field.

When the thin-film magnetic head h2 described above is manufactured, the lower core layer 167, the gap layer 174, and the upper core layer 178 are sequentially formed and patterned beforehand. The upper core layer 178 is formed by plating using flame plating followed by ion-milling, the width of the upper core layer 178 exposed at the medium-opposing face 152 is defined by a resist width for the flame plating or the like, plating, and etching, and the width of a magnetic recording track is defined by the width of the upper core layer 178 exposed at the medium-opposing face 152.

When the width of the magnetic recording medium (the width of the upper core layer 178 exposed at the medium-opposing face 152 in the magnetic pole region) of the thin-film magnetic head h2 is set to be small, the track width of the magnetic recording medium can be reduced, the track density of the magnetic recording medium can be increased, and the recording density can therefore be increased.

However, in the conventional thin-film magnetic head h2, there is a problem in that the writing density of the magnetic recording medium cannot be further improved because the upper core layer is thick. The reason for this is that, even though the layers are precisely formed by using flame plating and the like and the magnetic pole region is processed with the most advanced processing accuracy currently available, it is difficult for the width of the magnetic recording track to be not more than 1 μm due to a limitation of exposure resolution during pattern forming of the resist.

In addition, when a width of a magnetic recording track is set to be small, the lower core layer 167 and the upper core layer 178, with the gap layer 174 therebetween, at the ends of magnetic pole region X at the back region Y side, i.e., the depth of the magnetic gap from the medium-opposing face 152, the gap depth Gd may not be parallel to the medium-opposing face 152 in some cases, and as a result, a leakage magnetic field is increased, the writing capability of the thin-film magnetic head h2 may be lowered, the gap depth Gd may vary, and variation of the writing capability of the thin-film magnetic head h2 may occur. Accordingly, there is a requirement for precisely defining the position of the gap depth Gd.

SUMMARY OF THE INVENTION

Accordingly, taking the problems described above into consideration, the present invention is to achieve the following objects.

(1) To provide a thin-film magnetic head for a width of a magnetic recording track of not more than 1 μm, corresponding to a track width of not more than 1 μm.

(2) To improve accuracy in setting the position of a gap depth, i.e., a depth of the magnetic recording track from a medium-opposing face, in the magnetic head described above.

(3) To provide a method for manufacturing a thin-film magnetic head for a width of a magnetic recording track of not more than 1 μm.

In order to achieve the objects described above, the following structure according to the present invention is employed.

A thin-film magnetic head of the present invention has a structure comprising an upper core layer, a lower core layer, a coil, a gap layer, in which the upper core layer and the lower core layer extend from a back region toward a magnetic pole region, ends of the upper core layer and the lower core layer are exposed at a medium-opposing face, the upper core layer and the lower core layer are coupled to each other in the back region, the coil is disposed in the vicinity of the coupling portion between the upper core layer and the lower core layer, and the gap layer is disposed in the magnetic pole region between the upper core layer and the lower core layer. In the thin film magnetic head, an insulating layer is formed on the lower core layer, a groove is formed in the insulating layer in the magnetic pole region so as to extend from the medium-opposing face in the magnetic pole region toward the back region, a lower magnetic pole layer, the gap layer, an upper magnetic pole layer are formed in the groove, the lower magnetic pole layer is connected to the lower core layer, the upper magnetic pole layer is connected to the upper core layer, the upper magnetic pole layer composes an upper magnetic pole, and the lower magnetic pole layer composes a lower magnetic pole. In addition, the groove comprises openings at the lower core layer side, the upper core layer side, and the medium-opposing face side, a groove body portion having a cross-sectional size approximately equivalent to the opening at the medium-opposing face and extending in the magnetic pole region, and a groove-continuing portion continuing from the groove body portion and extending in the back region. By the structure thus described, the objects described above can be achieved.

In the present invention, a back insulating layer is preferably formed on the gap layer at the back region side.

In the present invention, a coil-insulating layer may be formed on the back insulating layer.

In the present invention, one of the following configurations for the groove-continuing portion may be selected. The configurations are the groove-continuing portion comprising a groove-extending portion having a cross-sectional size approximately equivalent to that of the groove body portion and extending in the back region; and the groove-continuing portion comprising a groove-expanding portion being connected to the groove body portion at the back region side thereof and expanding the size of the groove-expanding portion in the width direction of the upper core layer toward the back region.

One of the particular examples of the configuration described above is that the groove body portion and the groove-extending portion have two parallel side walls, being vertical from the lower core layer, extending to the medium-opposing face, being approximately parallel to each other. The other example is that the groove body portion has two parallel side walls, being vertical from the lower core layer, extending to the medium-opposing face, and being approximately parallel to each other, and the groove-expanding portion has two expanding side walls, continuing from the parallel side walls and vertical from the lower core layer, expanding the distance therebetween toward the back region. One of the examples described above may be selected.

The groove may comprise an inclined portion at the upper core layer side, in which the inclined portion has inclined side wall surfaces which continue from the side walls and incline toward the outside, in the width direction, of the groove body portion.

The lower magnetic pole layer and the gap layer may be formed in the groove in the magnetic pole region and the back region.

The upper magnetic pole layer may be formed in the groove in the magnetic pole region.

The gap depth may be defined by the end of the upper magnetic pole layer at the back region side.

The back insulating layer may comprise an inclined apex surface so as to increase the thickness of the back insulating layer from the medium-opposing face side toward the back region.

The coil-insulating layer may comprise an inclined surface inclining toward the apex surface of the back insulating layer.

The gap depth may be set to a dimension equivalent to the width of the upper magnetic pole layer or more.

In the thin-film magnetic head of the present invention, for example, the upper surface of the lower core layer may be a flat surface obtained by polishing, the inclined angle of the inclined side walls may be in the range from 10° to 80° to the lower core layer, the inclined angle of the apex surface of the back insulating layer may be in the range from 10° to 80° to the lower core layer, and the back insulating layer may be continuously disposed on the insulating layer.

The insulating layer is preferably composed of one of AlO, $Al_2O_3$, SiO, $SiO_2$, $Ta_2O_5$, TiO, AlN, AlSiN, TiN, SiN, $Si_3N_4$, NiO, WO, $WO_3$, BN, and CrN, and may be in the form of a single layer film or a multi-layered film.

The gap layer may be composed of at least one material of Au, Pt, Rh, Pd, Ru, Cr, a NiMo alloy, a NiW alloy, a NiP alloy, and a NiPd alloy.

The width of the groove body portion is preferably not more than 1 μm.

A configuration of a hybrid thin-film magnetic head may be selected, in which a reading head composed of a MR magnetic head or a GMR head, provided with a magnetoresistive element, and the thin-film magnetic head thus described are formed in a stacked structure.

In the thin-film magnetic head of the present invention, the lower core is composed of the lower core layer and the lower magnetic pole layer, the upper core is composed of the upper core layer and the upper magnetic pole layer, the magnetic gap is composed of the lower magnetic pole layer, the gap layer, and the upper magnetic pole layer, and the magnetic gap is disposed between the upper core layer and the lower core layer.

Since the lower magnetic pole layer, the gap layer, and the upper magnetic pole layer, composing the magnetic gap, are formed in the groove body portion formed beforehand, the width of a magnetic recording track is determined by the width of the groove body portion.

Consequently, by setting the width of the groove body portion to be narrow, the width of the magnetic recording track may be reduced to sub-micron size, that is, not more than 1 μm.

In the thin-film magnetic head of the present invention, the groove has openings at the lower core layer side, the upper core layer side, and the medium-opposing face side, and comprises the groove body portion having a cross-sectional size approximately equivalent to the opening at the medium-opposing face and extending in the magnetic pole region, and the groove-continuing portion continuing from the groove body portion and extending in the back region. The back insulating layer is formed on the gap layer at the back region side, and the coil-insulating layer is formed on the back insulating layer. Consequently, the gap depth of the magnetic gap can be determined by the end of the upper magnetic pole layer at the back region side and the position of the back insulating layer. Hence, variation of the distance between the medium-opposing face and the end of the upper magnetic pole layer can be prevented, and the gap depth may not therefore be varied.

In the thin-film magnetic head of the present invention, the configurations for the groove-continuing portion may be a configuration comprising a groove-extending portion having a cross-sectional size approximately equivalent to that of the groove body portion and extending in the back region, and a configuration comprising a groove-expanding portion connected to the groove body portion at the back region side thereof and expanding the size of the groove-expanding portion in the width direction of the upper core layer toward the back region. Consequently, by selecting one of the configurations described above, setting the position of the upper magnetic pole layer and the back insulating layer may be performed more precisely, and the variation of the gap depth of the magnetic gap may be further suppressed.

In addition, the distance between the lower core layer and the upper core layer can be increased by forming the coil-insulating layer on the back insulating layer, and performance of the magnetic head may be improved.

The inclined portion is provided in the groove, and the upper magnetic pole layer are formed in the groove body portion and along the inclined portion, and is connected to the upper core layer, whereby a tapered portion of the upper magnetic pole layer is formed at the upper core layer side. The apex surface of the back insulating layer is formed at the gap depth side, and a tapered portion of the upper core layer is therefore formed at the upper magnetic pole layer side. Consequently, due to the existence of the tapered portions, the flow of magnetic flux between the upper core layer and the upper magnetic pole layer becomes smoother, and the leakage magnetic flux at the junction area between the upper core layer and the upper magnetic pole layer may therefore be reduced.

The surface of the lower core layer becomes a flat surface having a surface roughness in the range from 0.001 $\mu$m to 0.015 $\mu$m by polishing the upper surface of the lower core layer. Hence, the groove may be precisely formed, and a width of a magnetic recording track may be further reduced.

Since the width of parallel side walls of the groove body portion is not more than 1 $\mu$m, more preferably 0.5 $\mu$m, the magnetic gap width may be set to be not more than 1 $\mu$m.

In the thin-film magnetic head of the present invention, an inclined angle of the inclined side wall is preferably in the range from 10° to 80° to the lower core layer.

In addition, an inclined angle of the apex surface of the back insulating layer is preferably in the range from 10° to 80° to the lower core layer.

When the inclined angle of the inclined side wall surface is less than 10°, it is not preferable, since reactance between the upper core layer and the lower core layer is reduced, and a leakage magnetic flux at the edge of the magnetic recording track is therefore increased. In contrast, when the inclined angle of the inclined side wall surface is more than 80°, it is also not preferable, since reactance of the upper magnetic pole layer is increased due to a decrease of the volume thereof, a loss of magnetic flux to be supplied to the upper magnetic pole layer from the upper core layer is generated, and an effective amount of magnetic flux for the magnetic gap is reduced.

When the inclined angle of the apex surface is less than 10°, it is not preferable, since reactance between the upper core layer and the lower core layer is reduced, and a leakage magnetic field from the upper core layer to the upper magnetic pole layer in the vicinity of the apex surface is therefore increased. In contrast, when the inclined angle of the apex surface is more than 80°, it is not preferable, since a smooth cross-sectional shape of the upper core layer cannot inevitably be formed, the cross-sectional shape of the upper core layer partly has sharp edges, an anti-magnetic field around these areas is increased, and recording efficiency is therefore decreased.

In the thin-film magnetic head of the present invention, the insulating layer, the lower magnetic pole layer, the gap layer, and the upper magnetic pole layer are preferably exposed at the medium-opposing face. In the structure thus formed, since the width of the magnetic recording track at the medium-opposing face agrees with the width of the groove of the insulating layer, the width of the magnetic recording track may therefore be set to be narrow, and since the magnetic gap is exposed at the medium-opposing face, magnetic recording on the magnetic recording medium may be effectively performed by a leakage magnetic field generated from the magnetic gap.

The insulating layer is preferably composed of one of AlO, $Al_2O_3$, SiO, $SiO_2$, $Ta_2O_5$, TiO, AlN, AlSiN, TiN, SiN, $Si_3N_4$, NiO, WO, $WO_3$, BN, and CrN, and may be in the form of a single layer film or a multi-layered film. When the insulating layer is composed of a material mentioned above, anisotropic etching may be performed for forming the groove, side-etching may not occur, and the precise width dimension of the groove (groove body portion) along the depth direction thereof may be specifically improved.

The gap layer is preferably composed of at least one of Au, Pt, Rh, Pd, Ru, Cr, a NiMo alloy, a NiW alloy, a NiP alloy, and a NiPd alloy, and may be in the form of a single layer film or a multi-layered film. These materials are optimum ones to compose gap layers of thin-film magnetic heads since they are non-magnetic materials that are not magnetized. In addition, since these materials are metal materials, and can be formed in the groove by electroplating using the lower core layer as an electrode, the gap layer can be securely formed in the groove body portion of the groove, and the width of the gap layer can agree with that of the groove body portion.

The lower magnetic pole layer and the upper magnetic pole layer are preferably composed of one of a FeNi alloy, a FeNi alloy in which Fe is richer than Ni, and a CoFeNi alloy, and may be in single layer films or multi-layered films. These materials are superior magnetic materials in terms of soft magnetic characteristics and are optimum materials for composing cores for thin-film magnetic heads, and may be formed in the groove by electroplating using the lower core layer as an electrode since they are metal materials.

According to the thin film magnetic head thus described, the following effects will be obtained.

As described above, in the thin film magnetic head of the present invention, the insulating layer is formed on the lower core layer, the groove is formed in the insulating layer, the groove has the groove body portion and the inclined portion, the lower magnetic pole layer, the gap layer, and the upper magnetic pole layer are formed in the groove, so that the lower magnetic pole layer is connected to the lower core layer and the upper magnetic pole layer is to be connected to the upper core layer, and the lower magnetic pole layer, the gap layer, and the upper magnetic pole layer, composing the magnetic gap, are formed in the groove body portion formed beforehand, whereby the width of the magnetic recording track is determined by the width of the groove body portion. Consequently, by reducing the width of the groove body portion, the width of the magnetic recording track may be therefore reduced.

In addition, in this thin-film magnetic head of the present invention, since the gap depth of the magnetic gap is determined by the distance from the medium-opposing face to the end of the back insulating layer in the groove body portion and the upper magnetic pole layer composing the gap depth is formed in the groove body portion, the gap depth may not vary.

In the thin film magnetic head of the invention, the lower magnetic pole layer and the gap layer are formed in the groove body portion, and the upper magnetic pole layer is continuously formed in the groove body portion to the inclined portion, whereby the tapered portion of the upper magnetic pole layer is formed at the upper core layer side. Consequently, due to the existence of the tapered portions, the flow of the magnetic flux between the upper core layer and the upper magnetic pole layer becomes smoother, and the leakage magnetic flux at the junction area between the upper core layer and the upper magnetic pole layer may therefore be avoided. In addition, due to the existence of the apex surface and the inclined surface formed on the back insulating layer and the coil-insulating layer, respectively, the flow of the magnetic flux between the upper core layer and the upper magnetic pole layer becomes smoother, and the leakage magnetic flux at the junction area between the upper core layer and the upper magnetic pole layer may therefore not occur.

Since the lower magnetic pole layer, the gap layer, and the upper magnetic pole layer are formed in the groove body portion, and the width of the groove body portion is set to be not more than 1 $\mu$m, more preferably not more than 0.5 $\mu$m, the width of the magnetic recording track may be not more than 1 $\mu$m.

Since the insulating layer, the lower magnetic pole layer, the gap layer, and the upper magnetic pole layer are exposed at the medium-opposing face, the width of the magnetic recording track at the medium-opposing face agrees with the width of the groove, and the width of the magnetic recording track may be reduced. In addition, magnetic recording may be effectively performed on the magnetic recording medium by a leakage magnetic field generated from the magnetic gap.

When the hybrid thin-film magnetic head, which has the reading magnetic head provided with a magnetoresistive element and the thin film magnetic head described above in a stacked structure, is used for magnetic recording apparatuses, specifically such as computers, magnetic recording apparatuses having high recording density and large recording capacity may be provided.

A method for manufacturing a thin-film magnetic head of the present invention will be described, in which the thin-film magnetic head comprises an upper core layer, a lower core layer, a coil, and a gap layer, the upper core layer and the lower core layer extending from a back region toward a magnetic pole region, ends of the upper core layer and the lower core layer being exposed at a medium-opposing face, the upper core layer and the lower core layer being magnetically coupled to each other in the back region, the coil being disposed in the vicinity of the coupling portion between the upper core layer and the lower core layer, the gap layer being disposed in the magnetic pole region between the upper core layer and the lower core layer. The method for manufacturing the thin film magnetic head of the present invention comprises the steps of planarizing the upper surface of the lower core layer by polishing; forming an insulating layer on the lower core layer; forming a groove in the insulating layer, the groove extending along the outside of the medium-opposing face in the magnetic pole region, the magnetic pole region, and the back region so that the bottom of the groove reaches the lower core layer; forming a lower magnetic pole layer, the gap layer, and an upper magnetic layer in the groove so as to connect the lower core layer and the lower magnetic pole layer to each other; forming a gap depth on the upper magnetic pole layer approximately parallel to the medium-opposing face; forming a back insulating layer on the gap layer in the back region; forming the coil in the back region; and forming the upper core layer so as to join the upper magnetic pole layer in the magnetic pole region and to cover a part of the coil. The thin film magnetic head thus formed according to the present invention solves the problems described above.

In the thin-film magnetic head of the present invention, the groove is preferably formed by performing anisotropic etching of the insulating layer.

A groove body portion which has the cross-sectional size approximately equivalent to an opening of the groove at the medium-opposing face and extends in the magnetic pole region, and a groove-continuing portion which extends in the back region continuously from the groove body portion, may be formed.

One of a formation technique for a groove-extending portion which has the cross-sectional size approximately equivalent to that of the groove body portion and which extends in the back region in the groove-continuing portion, and a formation technique for a groove-expanding portion which is connected to the groove body portion at the back region side thereof and which expands the size of the groove-expanding portion in the width direction of the upper core layer toward the back region may be selected.

After the formation of the groove, an inclined portion of the groove may be formed at the upper core layer side by etching with ion beam irradiation on the connecting portion between the upper surface of the insulating layer and the groove.

The width of the groove at the medium-opposing face is preferably set to be not more than 1 $\mu$m.

The lower magnetic pole layer and the gap layer may be formed in the groove body portion and the groove-continuing portion, and the upper magnetic pole layer may be formed in the groove body portion, the groove-continuing portion, and up to the inclined portion.

An electroplating technique for forming the lower magnetic pole layer, the gap layer, and the upper magnetic pole layer by using the lower core layer as an electrode may be selected.

After forming an upper mask layer on the upper magnetic pole layer, the gap depth is preferably formed by performing ion milling of the upper magnetic layer.

The back insulating layer, which is disposed on the gap layer in the back region and has an apex surface inclining so as to increase the thickness of the back insulating layer from the medium-opposing face toward the back region, may be formed by sputtering while the upper mask adheres on the upper magnetic pole layer followed by removal of the upper mask layer.

When the coil-insulating layer is formed on the back insulating layer, an inclined surface of the coil layer inclining toward the apex surface of the back insulating layer may be formed.

When the lower core layer is to be flat by polishing, the insulating layer formed in the subsequent step may be flat, the groove may be precisely formed by anisotropic etching, and the width of the magnetic recording track may be set to be small.

When the groove is formed by anisotropic etching, side-etching may not occur, and dimensional accuracy of the width of the groove along the depth thereof may be improved.

When the groove is formed, it is preferable that the mask layer be formed on the insulating layer, the mask layer be patterned, and anisotropic etching of the insulating layer exposed by the pattern be performed.

Anisotropic etching is most preferably performed by the reactive ion etching in terms of dimensional accuracy for forming the groove.

One of a photoresist layer, a metal film layer, a composite of a photoresist layer and a metal layer, and a metal oxide layer is preferably used as the mask layer.

The photoresist layer may be composed of, in addition to common positive and negative photoresists, a photoresist which can be exposed by ultraviolet rays, electron beams, x-rays, ion beams, and the like.

The metal film layer is preferably composed of at least one of Ti, Zr, Nb, Ta, Cr, Mo, W, Ru, Co, Rh, Ir, Ni, Pd, Pt, Au, Al, In, and Si, and may be formed in a single layer film or a multi-layered film.

In addition, the metal oxide layer is preferably at least one of SiO, $SiO_2$, TaO, $Ta_2O_5$, TiO, SiN, $Si_3N_4$, Cro, WO, ZrO, NiO, AlO and IrO, and may be formed in a single layer film or a multi-layered film.

Reacting gas used for forming the groove by the reactive ion etching method is preferably one of $CF_4$, a mixture of $CF_4$ and $O_2$, $C_2F_6$, a mixture of $C_2F_6$ and $O_2$, $C_4F_8$, a mixture of $C_4F_8$ and $O_2$, $Cl_2$, $BCl_3$, a mixture of $Cl_2$ and $BCl_3$, and $CHF_3$, and as well as mixtures thereof with Ar. Among these reacting gases, a suitable one is selected in accordance with the materials used for the insulating layer and the mask layer.

According to the method for manufacturing the thin film magnetic head thus described, the following effects will be obtained.

The method for manufacturing the thin film magnetic head of the present invention described above comprises the steps of planarizing the upper surface of the lower core layer by polishing; forming the insulating layer on the lower core layer; forming the groove in the insulating layer, the groove extending from the medium-opposing face to the back region so that the bottom of the groove reaches the lower core layer; the lower magnetic pole, the gap layer, the upper magnetic layer, and the back insulating layer are formed in the groove so that the lower core layer joins the lower magnetic pole layer; forming the coil above the insulating layer in the back region, and forming the upper core layer so as to join the upper magnetic pole layer in the magnetic pole region and to cover a part of the coil in the back region. By the method described above, the magnetic gap is formed by the lower magnetic pole layer and the upper core layer, the width of the magnetic recording track is determined by the width of the groove, and in addition, the width of the groove can be not more than 1 μm, more preferably not more than 0.5 μm. Consequently, the width of the magnetic recording track may be smaller than that of the conventional thin film magnetic head, and variation of the gap depth can be prevented since the gap depth is determined by the distance from the medium-opposing face to the back insulating layer.

In addition, since the lower magnetic pole layer, the gap layer, and the upper magnetic pole layer are formed by electroplating using the lower core layer as an electrode, the lower magnetic pole layer, the gap layer, and the upper magnetic pole layer are securely formed in the groove.

DESCRIPTION OF THE PREFERRED EMBODIMENT

A first embodiment of a thin-film magnetic head and a manufacturing method therefor according to the present invention will be described with reference to the drawings.

Figure 1:
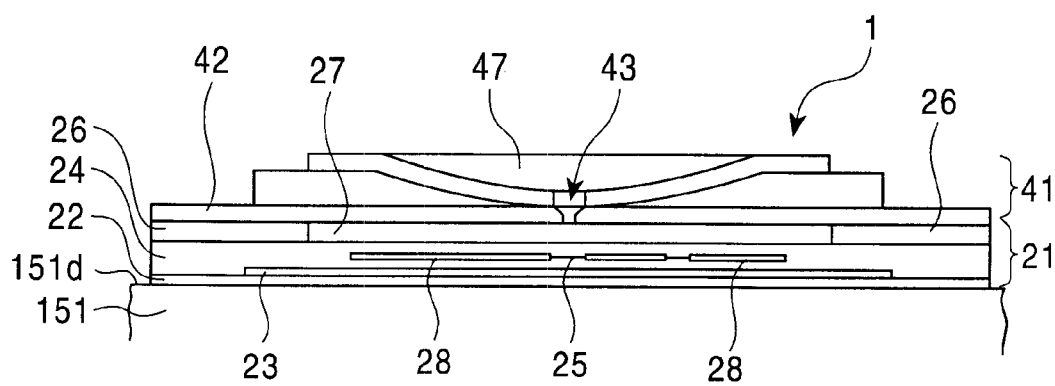
FIG. 1 is a front view of a hybrid thin-film magnetic head according to a first embodiment of the present invention.
Figure 2:
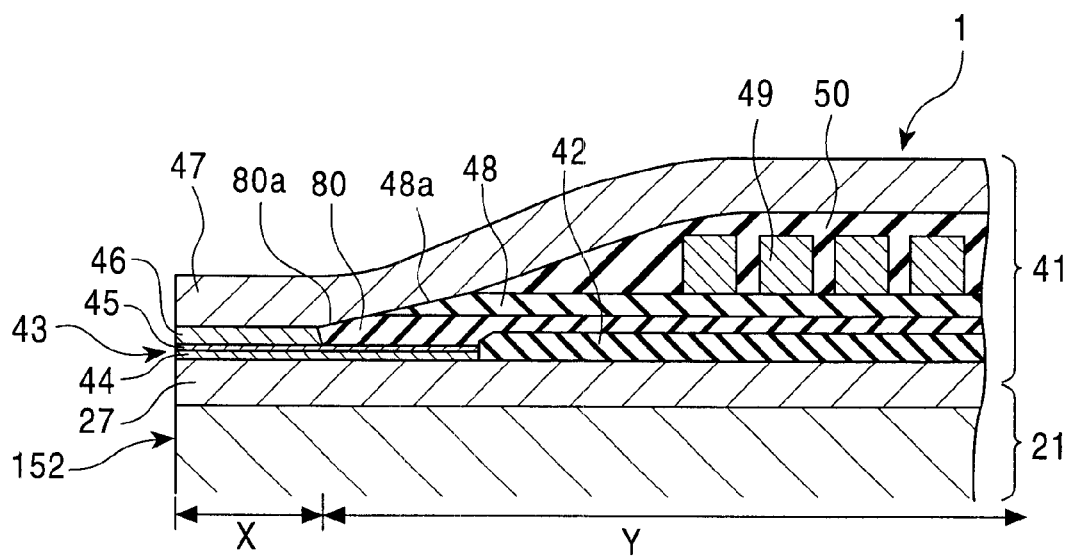
FIG. 2 is a cross-sectional side view of a thin-film magnetic head according to the first embodiment of the present invention.

FIG. 1 is a front view of a hybrid thin-film magnetic head of the embodiment, and FIG. 2 is a cross-sectional side view of the hybrid thin-film magnetic head.

Figure 36:
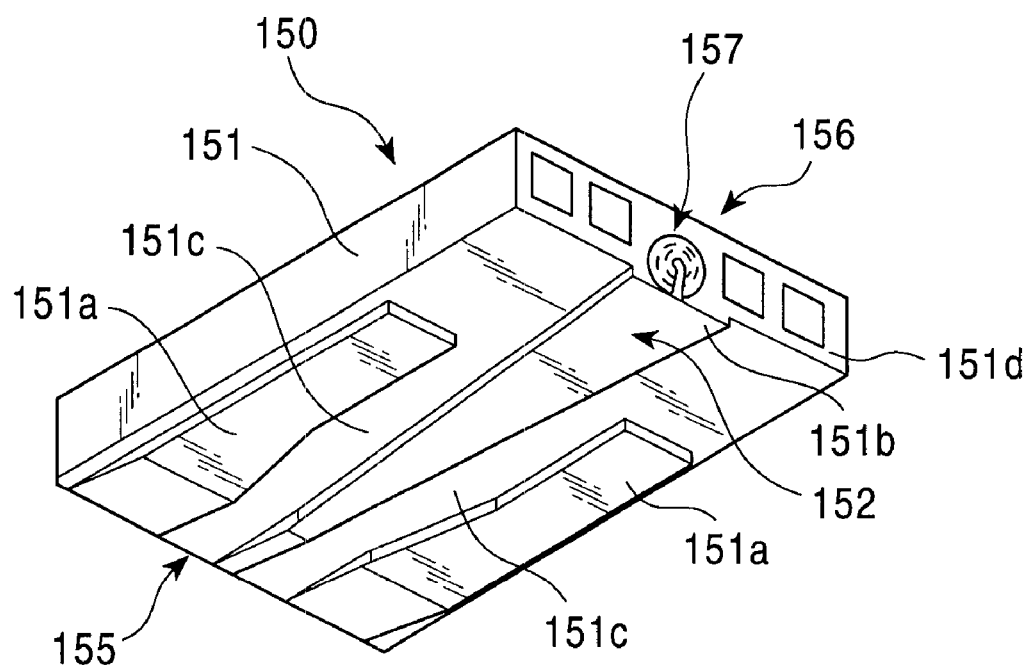
FIG. 36 is a perspective view of a conventional floating-type magnetic head.
Figure 37:
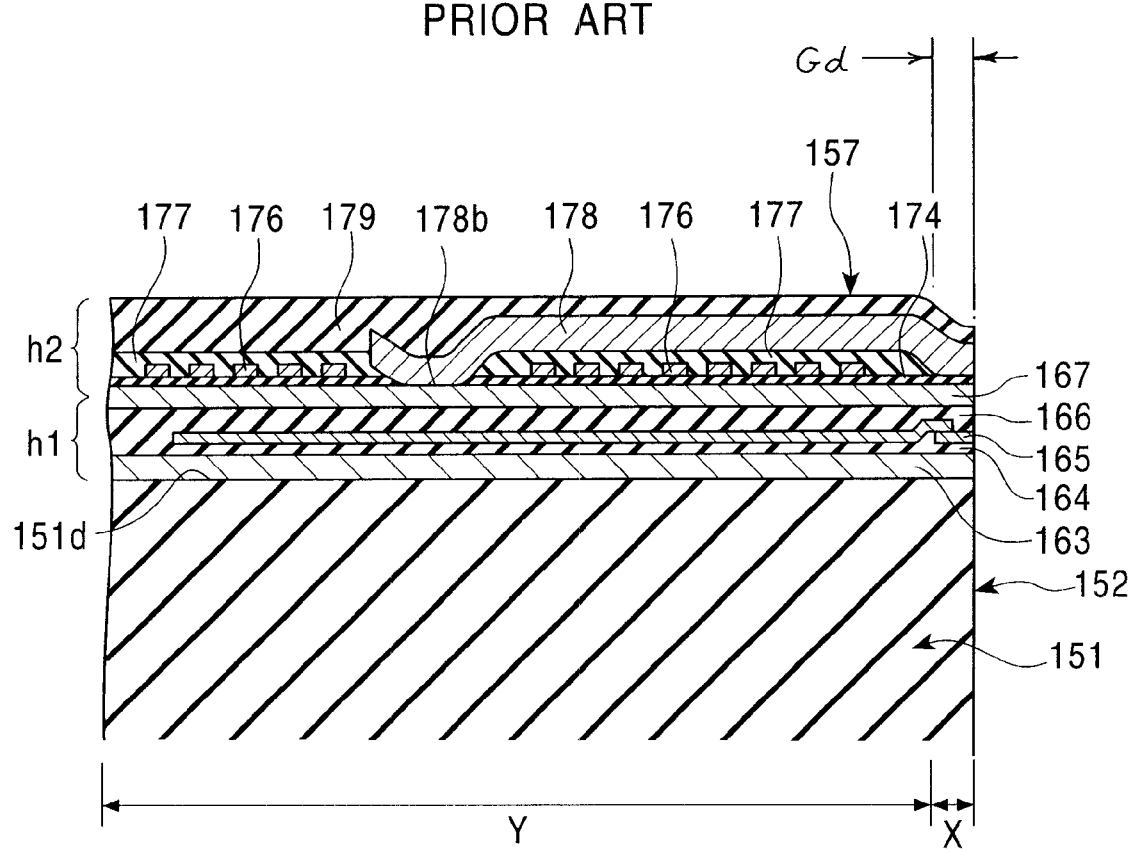
FIG. 37 is a cross-sectional side view of a conventional hybrid thin-film magnetic head.
Figure 38:
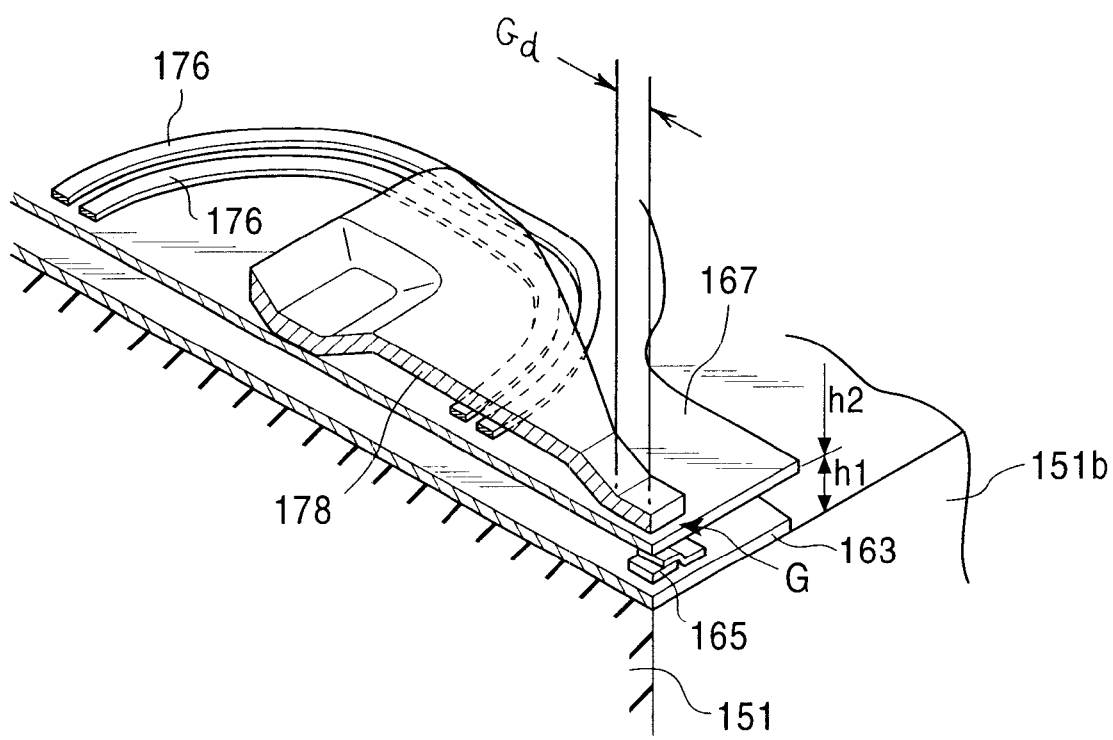
FIG. 38 is a perspective view of the conventional hybrid thin-film magnetic head.

The same reference labels of the constituent elements shown in FIGS. 36 to 38 designate the same elements in these drawings, and a description thereof will be omitted.

As shown in FIG. 1, the hybrid thin-film magnetic head 1 of the embodiment has a reading head (magnetoresistive (MR) magnetic head or giant magnetoresistive (GMR) magnetic head) 21 having a magnetoresistive element and an inductive head (writing head) 41, being formed on a side wall 151d of a slider 151 in a stacked structure.

As shown in FIG. 1, the reading head 21 comprises an insulating layer 22 formed on the side wall 151d of the slider 151, a lower shield layer 23 composed of a magnetic alloy and formed on the insulating layer 22, a reading gap layer 24 provided with reading elements embedded therein and formed on the lower shield layer 23, which reading gap layer 24 is used for setting a shield gap of the reading head 21, a magnetoresistive element 25 embedded in the reading gap layer 24 in which a part the magnetoresistive element 25 is exposed at a medium-opposing face 152, an upper shield planarizing gap layer 26 formed on the reading gap layer 24, and an upper shield layer 27 surrounded by the upper shield planarizing gap layer 26. The upper shield layer 27 is also used as a lower core layer for the writing head 41. The upper shield layer (lower core layer) 27 is preferably a soft magnetic alloy composed of a FeNi alloy, a FeCoNi alloy, and the like, and may be formed in a single layer film or a multi-layered film.

Individual ends of the lower shield layer 23, the reading gap layer 24, the upper shield planarizing gap layer 26, the upper shield layer 27, and the magnetoresistive element 25 are exposed at the medium-opposing face 152.

The magnetoresistive element 25 is connected to electrodes 28 to apply a sense current.

The magnetoresistive element 25 may be, for example, a so-called giant magnetoresistive element (GMR element), in addition to elements composed of soft magnetic materials having magnetoresistance.

In the reading magnetic head 21 described above, when a leakage magnetic field from a magnetic recording medium is applied to the magnetoresistive element 25, the resistance thereof changes, and voltage changes in accordance with the resistance changes can be read as read signals from the magnetic recording medium.

Figure 3:
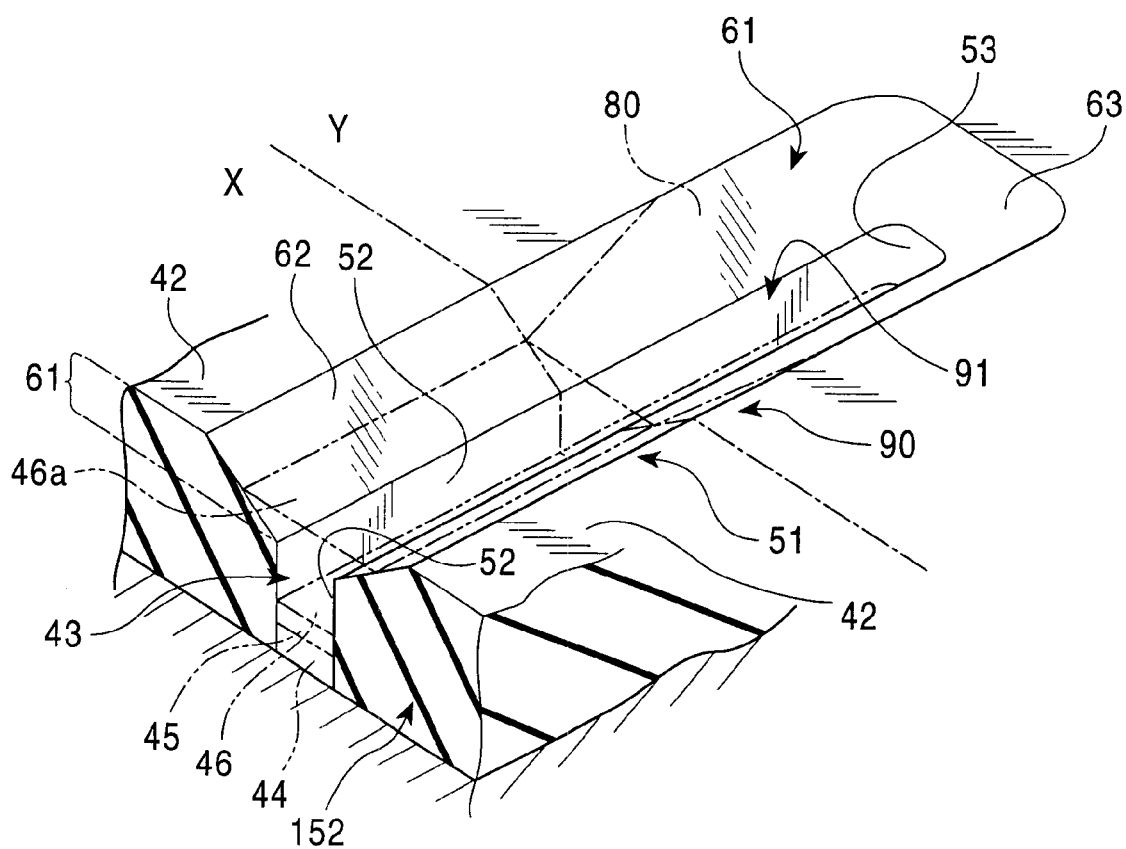
FIG. 3 is a perspective view showing important portions of a groove and a magnetic pole region of the thin-film magnetic head according to the first embodiment of the present invention.
Figure 4:
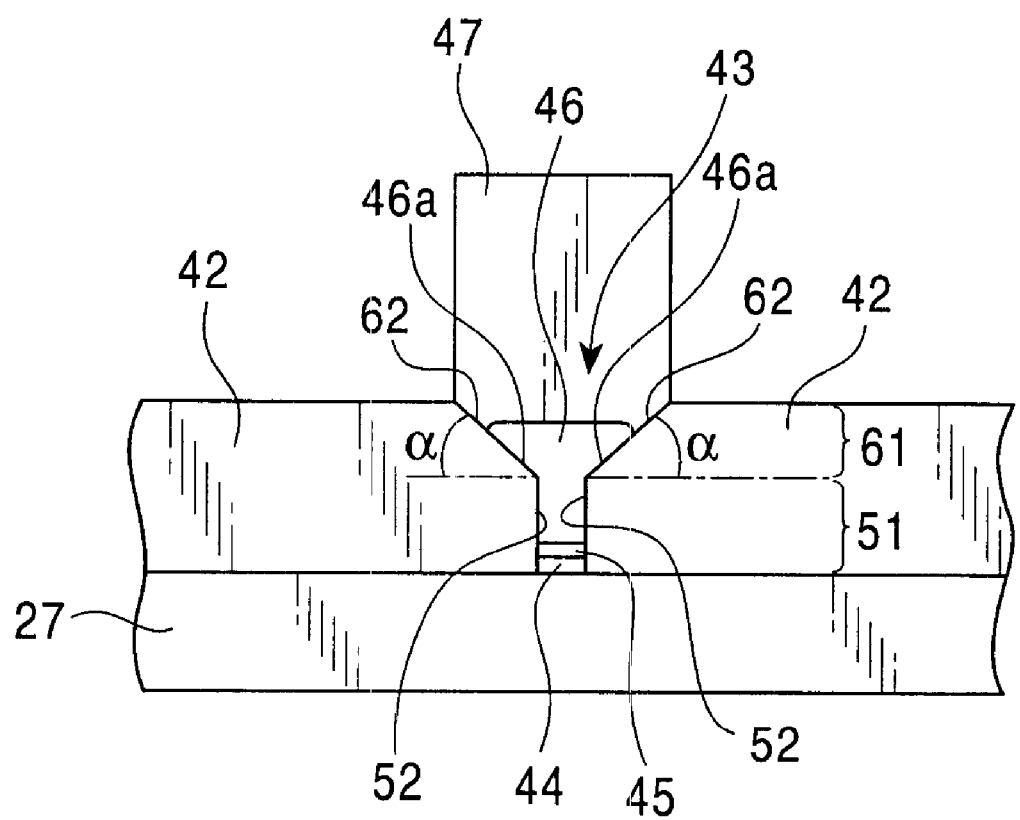
FIG. 4 is a front view showing important portions of the hybrid thin-film magnetic head in the magnetic pole region according to the first embodiment of the present invention.
Figure 5:
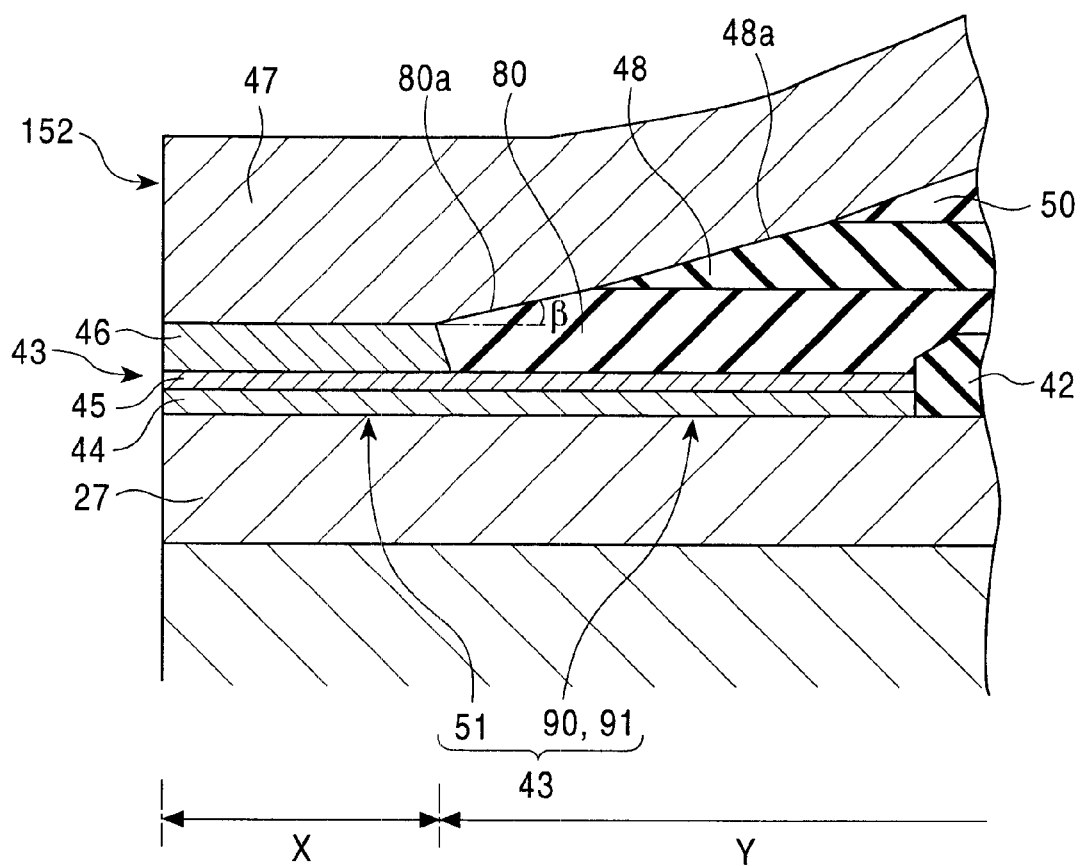
FIG. 5 is a cross-sectional side view showing important portions of the hybrid thin-film magnetic head in the magnetic pole region according to the first embodiment of the present invention.

FIG. 3 is a perspective view showing a groove 43 and an important portion of a magnetic pole region X of the thin-film magnetic head of the embodiment, FIG. 4 is a front view thereof, and FIG. 5 is a cross-sectional side view thereof.

In the writing head 41 of the embodiment, as shown in FIG. 1 to FIG. 5, an insulating layer 42 is formed on the lower core layer (upper shield layer) 27; the groove 43 extending from the medium-opposing face 152 in the magnetic pole region X toward a back region Y is formed in the insulating layer 42; and a lower magnetic pole layer 44, a gap layer 45, an upper magnetic pole layer 46, a back insulating layer 80, and a coil-insulating layer 48 are formed in the groove 43. The lower magnetic pole layer 44 is connected to the lower core layer 27, and the upper magnetic pole layer 46 is connected to the upper core layer 47. The upper magnetic pole layer 46 composes an upper magnetic pole, and the lower magnetic pole layer 44 composes a lower magnetic pole.

As shown in FIG. 2, the upper core layer 47 and the lower core layer 27 extend from the back region Y to the magnetic pole region X, and ends of the upper and lower core layers 47 and 27 are exposed at the medium-opposing face 152. The upper core layer 47 and the lower core layer 27 are magnetically coupled to each other in the back region Y.

The back insulating layer 80 is disposed on the gap layer 45 at the back region Y side and is disposed on the insulating layer 42 at the back region Y side.

As shown in FIG. 2, the magnetic pole region X is a region in which the upper core layer 47 and the lower core layer 27 oppose each other with the gap layer 45 therebetween in the vicinity of the medium-opposing face 152, and the back region Y is a region other than the magnetic pole region X.

As shown in FIGS. 3 to 5, the groove 43 is composed of a groove body portion 51 which has a cross-sectional size approximately equivalent to an opening of the groove at the medium-opposing face 152, is adjacent to the lower core layer 27, and extends in the magnetic pole region X, and a groove-continuing portion 90 which continuously extends in the back region Y from the groove body portion 51 and which is adjacent to the lower core layer 27. The groove body portion 51 and the groove-continuing portion 90 have an inclined portion 61 at the upper core layer 47 side.

The groove-continuing portion 90 has a groove-extending portion 91 having a cross-sectional size approximately equivalent to that of the groove body portion 51 and extending in the back region Y.

The groove body portion 51 and the groove-extending portion 91 have two vertical parallel side walls 52 reaching the medium-opposing face 152, which are formed on the lower core layer 27 and are approximately parallel to each other. These two parallel side walls 52 are connected to each other by an end face 53 at the end of the groove-extending portion 91 in the back region Y, the end face 53 being approximately parallel to the medium-opposing face 152 and having a rounded form at the connecting portion thereof for connecting the parallel side walls 52.

The inclined portion 61 is at least defined by two inclined side wall surfaces 62, which continue from the parallel side wall 52 and are inclined towards the outside in the width direction of the groove body portion 51 and the groove-extending portion 91, and an end inclined surface 63, which continues from the end face 53 and is inclined towards the back region Y side.

The lower magnetic pole layer 44 and the gap layer 45 are formed in the groove body portion 51 and the groove-extending portion 91, and the lower magnetic pole layer 44 is connected to the lower core layer 27.

The upper magnetic pole layer 46 is formed in the groove body portion 51 up to the inclined portion 61 in the magnetic pole region X, and is connected to the upper core layer 47. A gap depth is determined by the end of the upper magnetic pole layer 46 at the back region Y side.

As shown in FIG. 5, the back insulating layer 80 and the coil-insulating layer 48 are formed on the gap layer 45 and are disposed in the groove-extending portion 91 at the back region Y side, and the back insulating layer 80 has an apex surface 80a inclined from the medium-opposing face 152 side toward the back region Y so as to increase the thickness of the back insulating layer 80. The coil-insulating layer 48 has an inclined surface 48a inclined toward the apex surface 80a described above.

The insulating layer 42, the lower magnetic pole layer 44, the gap layer 45, and the upper magnetic pole layer 46 are exposed at the medium-opposing face 152.

By the structure thus described, since the width of a magnetic recording track at the medium-opposing face 152 agrees with that of the groove 43, when accuracy for forming the width of the groove is improved, the width of the magnetic recording track can be reduced. In addition, since the magnetic recording track is exposed to the medium-opposing face 152, magnetic recording on the magnetic recording medium can be effectively performed by a leakage magnetic field generated from the magnetic gap to the outside of the magnetic recording track.

In the thin-film magnetic head 41 of the present invention, the lower core is composed of the lower core layer 27 and the lower magnetic pole layer 44; the upper core is composed of the upper core layer 47 and the upper magnetic pole layer 46; the magnetic gap is composed of the lower magnetic pole layer 44, the gap layer 45, and the upper magnetic pole layer 46; and the magnetic gap exists between the upper core and the lower core.

Since a part of the lower magnetic pole layer 44, the gap layer 45, and the upper magnetic pole layer 46, which compose the magnetic gap, are formed in the groove body portion 51 formed beforehand, the width of the magnetic recording track is determined by that of the groove body portion 51. Hence, by reducing the width of the groove body portion 51, the width of the magnetic recording track can be reduced.

When the width of the groove body portion 51 is not more than 1 $\mu$m, and more preferably not more than 0.5 $\mu$m, the width of the magnetic recording track can be not more than 1 $\mu$m.

In this thin-film magnetic head 41 of the present invention, since the gap depth of the magnetic gap is determined by the distance from the medium-opposing face 152 to the front end of the back insulating layer 80, the gap depth does not vary.

As shown in FIGS. 3 and 4, in the thin-film magnetic head 41 of the present invention, since the upper magnetic pole layer 46 is formed in the groove body portion 51 and continuously up to the inclined portion 61, and is connected to the upper core layer 47, a tapered portion 46a of the upper magnetic pole layer 46 is formed at the upper core layer 47 side. Due to the existence of the tapered portion 46a, the flow of magnetic flux between the upper core layer 47 and the upper magnetic pole layer 46 becomes smoother along the tapered portion 46a, and the leakage magnetic flux at the junction area between the upper core layer 47 and the upper magnetic pole layer 46 to unwanted areas adjacent to the junction area is therefore avoided.

In the thin-film magnetic head 41 described above, the apex surface 80a and the inclined surface 48a are formed on the back insulating layer 80 and the coil-insulating layer 48, respectively, as shown in FIG. 5. Consequently, similarly to above, due to the existence of the apex surface 80a and the inclined surface 48a, the flow of magnetic flux at the boundary between the upper core layer 47 and the upper magnetic pole layer 46 becomes smoother, and the leakage magnetic flux at the junction area between the upper core layer 47 and the upper magnetic pole layer 46 to unwanted areas adjacent to the junction area is therefore avoided.

An inclined angle α of the inclined side wall surface 62 to the upper surface of the lower core layer 27, as shown in FIG. 4, is preferably in the range from 10° to 80°.

In addition, it is preferable that an inclined angle β of the apex surface 80a of the back insulating layer 80 to the lower core layer 27 be in the range from 10° to 80°, and an inclined angle of the inclined surface 48a of the coil-insulating layer 48 to the lower core layer 27 be in the range from 10° to 80° in accordance with the inclined angle β of the apex surface 80a.

When the inclined angle α of the inclined side wall surface 62 is less than 10°, it is not preferable, since the reactance between the upper core layer 47 and the lower core layer 27 is reduced, and a leakage magnetic flux at the edge of the magnetic recording track is therefore increased. In contrast, when the inclined angle α of the inclined side wall surface 62 is more than 80°, it is also not preferable, since the reactance of the upper magnetic pole layer 46 is increased due to a decrease of the volume thereof, a loss of magnetic flux to be supplied to the upper magnetic pole layer 46 from the upper core layer 47 is generated, and the effective amount of magnetic flux for the magnetic gap is reduced.

When the inclined angle β of the apex surface 80a and the inclined angle of the inclined surface 48a are less than 10°, it is not preferable, since the reactance between the upper core layer 47 and the lower core layer 27 is decreased, and a leakage magnetic field from the upper core layer 47 to the upper magnetic pole layer 46 in the vicinity of the apex surface 80a is therefore increased. In contrast, when the inclined angle β of the apex surface 80a and the inclined angle of the inclined surface 48a are more than 80°, it is not preferable, since, inevitably, a smooth cross-sectional shape of the upper core layer 47 cannot be formed, the cross-sectional shape of the upper core layer 47 partly has sharp edges, an anti-magnetic field around these areas is increased, and recording efficiency is therefore decreased.

In addition, a coil 49 is formed on the coil-insulating layer 48, as shown in FIG. 2, and an upper insulating layer 50 covering the coil-insulating layer 48 and the coil 49 is formed.

The coil 49 is patterned on the coil-insulating layer 48 so as to be planar and helical.

The upper core layer 47 covers the upper magnetic pole layer 46, the apex surface 80a of the back insulating layer 80, the inclined surface 48a of the coil-insulating layer 48, and the upper insulating layer 50, and is formed so as to cover the coil 49 with the upper insulating layer 50.

Since the coil-insulating layer 48 is disposed between the back insulating layer 80 and the coil 49, insulation of the upper core layer 47 and the coil 49 from the lower magnetic pole layer 44 and the lower core layer 27 is improved, and the apex angle of the apex surface 80a of the back insulating layer 80 can be further adjusted. That is, the apex of the inclined surface 48a can be controlled by the thickness of the coil-insulating layer 48, so that the control of an optimum form of the upper core layer 47 can be performed. The apex angle β of the apex surface 80a of the back insulating layer 80 can also be adjusted by the thickness of the back insulating layer 80; however, since the time for film formation by sputtering, ion-milling, or the like, increases according to an increase of the thickness of the back insulating layer 80, and patterning of the gap depth by a lift-off method becomes more difficult according to an increase of the thickness of the back insulating layer 80, it is preferable that the back insulating layer 80 be as thin as possible. Hence, the inclined surface 48a is formed on the coil-insulating layer 48 to correct the apex angle.

The insulating layer 42 is preferably composed of one of AlO, $Al_2O_3$, SiO, $SiO_2$, $Ta_2O_5$, TiO, AlN, AlSiN, TiN, SiN, $Si_3N_4$, NiO, WO, $WO_3$, BN, and CrN, and may be formed in a single layer film or a multi-layered film. When the insulating layer 42 is composed of the material described above, an anisotropic etching can be performed when the groove 43 is formed, as described below, whereby side-etching does not occur and dimensional accuracy of the groove width along the depth of the groove 42 can be specifically improved.

The gap layer 45 is preferably composed of at least one of Au, Pt, Rh, Pd, Ru, Cr, a NiMo alloy, a NiW alloy, a NiP alloy, and a NiPd alloy, and may be formed in a single layer film or a multi-layered film. These materials are optimum ones to compose gap layers of thin-film magnetic heads since they are non-magnetic materials that are not magnetized. In addition, since these materials can be formed in the groove 43 by electroplating using the lower core layer 27 as an electrode because they are metal materials, a part of the gap layer 45 on which the upper magnetic pole layer 46 is formed can be securely formed in the groove body portion 51 of the groove 43, and the width of the gap layer 45 can agree with that of the groove body portion 51.

Furthermore, the lower magnetic pole layer 44 and the upper magnetic pole layer 46 are preferably composed of one of a FeNi alloy, a FeNi alloy in which Fe is richer than Ni, and a CoFeNi alloy, and may be formed in a single layer film or a multi-layered film. These materials are superior magnetic materials in terms of soft magnetic characteristics and are optimum materials for composing cores for thin-film magnetic heads, and can be formed in the groove 43 by electroplating using the lower core layer 27 as an electrode because they are metal materials.

In the thin-film magnetic head 41 described above, a writing current is applied to the coil 49, and magnetic fields are generated by this writing current in the upper core layer 47 and the lower core layer 27. Furthermore, upon application of these magnetic fields to the upper magnetic pole layer 46 and the lower magnetic pole layer 44, a magnetic field leaks outside the gap layer 45 and then generates a leakage magnetic field, whereby the magnetic recording medium is magnetized by this leakage magnetic field so that writing signals are written.

Next, a method for manufacturing the thin-film magnetic head according to the present invention will be described.

The method for manufacturing the thin-film magnetic head of the present invention will be described later in detail with reference to FIGS. 6 to 27, however, as a summary thereof the method comprises the steps of polishing the upper surface of the lower core layer 27 to be flat; forming the insulating layer 42 on the lower core layer 27; forming the groove 43 in the insulating layer 42, which groove 43 is extended from the outside of the medium-opposing face 152 in the magnetic pole region to the back region Y via the magnetic pole region X; forming the lower magnetic pole layer 44, the gap layer 45, and the upper magnetic pole layer 46 in the groove 43, in which the lower core layer 27 is connected to the lower magnetic pole layer 44; then forming the back insulating layer 80 and the coil-insulating layer 48 in a layered structure; and forming the upper core layer 47 to be joined with the upper magnetic pole layer 46.

Figure 6:
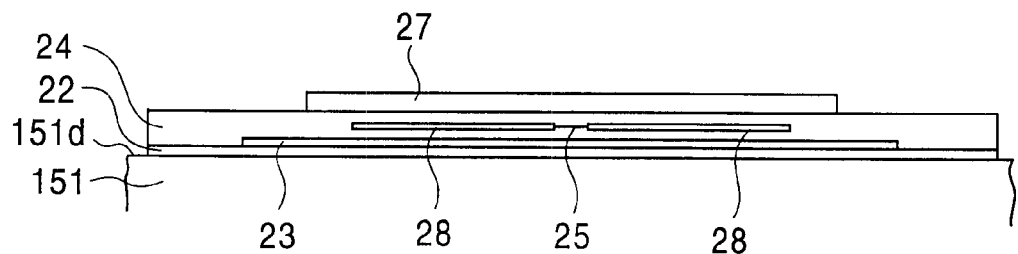
FIG. 6 is a front view of the hybrid thin-film magnetic head illustrating a method for manufacturing the thin-film magnetic head according to the first embodiment of the present invention.

A more detailed explanation will be made. As shown in FIG. 6, on the side wall 151d of the slider 151, the substrate insulating layer 22, the lower shield layer 23, the magnetoresistive element 25, the electrodes 28, and the reading gap layer 24, are formed sequentially, and the lower core layer (the upper shield layer) 27 is formed on the reading gap layer 24.

Figure 7:
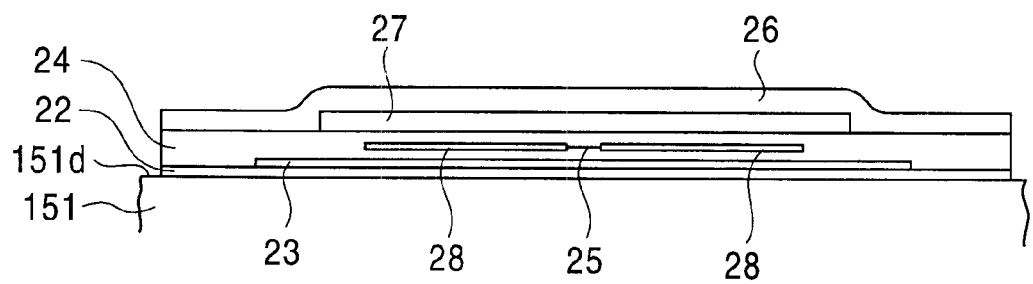
FIG. 7 is a front view of the hybrid thin-film magnetic head illustrating the method for manufacturing the thin-film magnetic head according to the first embodiment of the present invention.

Next, as shown in FIG. 7, the upper shield planarizing gap layer 26 is formed to cover the reading gap layer 24 and the lower core layer 27.

Figure 8:
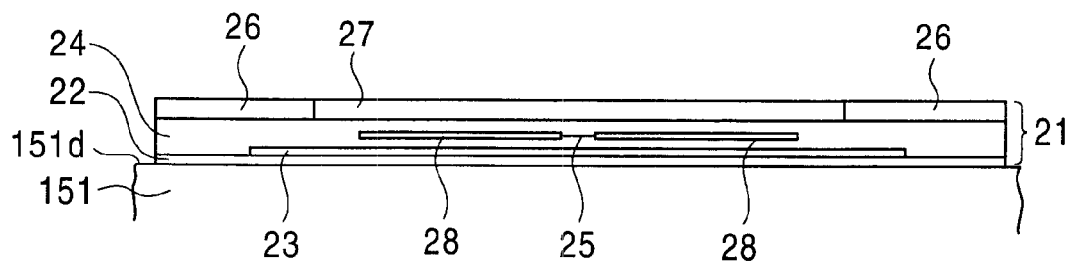
FIG. 8 is a front view of the hybrid thin-film magnetic head illustrating the method for manufacturing the thin-film magnetic head according to the first embodiment of the present invention.

As shown in FIG. 8, an upper surface of the lower core layer 27 is exposed by polishing the upper surface of the upper shield planarizing gap layer 26, and the upper surface of the lower core layer 27 is then polished so as to be flat. For this polishing, so-called chemical mechanical polishing (CMP), or the like, can be performed.

The flatness of the upper surface of the lower core layer 27 is preferably in the range from 0.001 $\mu$m to 0.015 $\mu$m in terms of surface roughness.

At this stage, the MR magnetic head 21 is completed.

The reason for planarizing the upper surface of the lower core layer 27 by polishing is to planarize the insulating layer to be formed in a subsequent process, and as a result, the groove can be precisely formed by anisotropic etching as described below and the width of the magnetic recording track can therefore be reduced.

Figure 9:
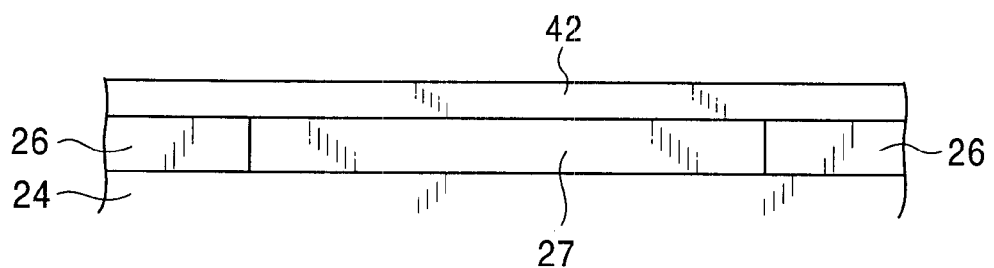
FIG. 9 is a front view of the thin-film magnetic head illustrating the method for manufacturing the thin-film magnetic head according to the first embodiment of the present invention.

Next, as shown in FIG. 9, the insulating layer 42 is formed so as to cove a part of the upper shield planarizing gap layer 26 and the lower core layer 27. The insulating layer 42 is composed of one of AlO, $Al_2O_3$, SiO, $SiO_2$, $Ta_2O_5$, TiO, AlN, AlSiN, TiN, SiN, $Si_3N_4$, NiO, WO, $WO_3$, BN, and CrN, is in the form of a single layer film or a multi-layered film, and is formed by a method such as sputtering, chemical vapor deposition (CVD), or evaporation. The thickness of the insulating layer 42 is preferably in the range from 0.5 $\mu$m to 2 $\mu$m.

Figure 10:
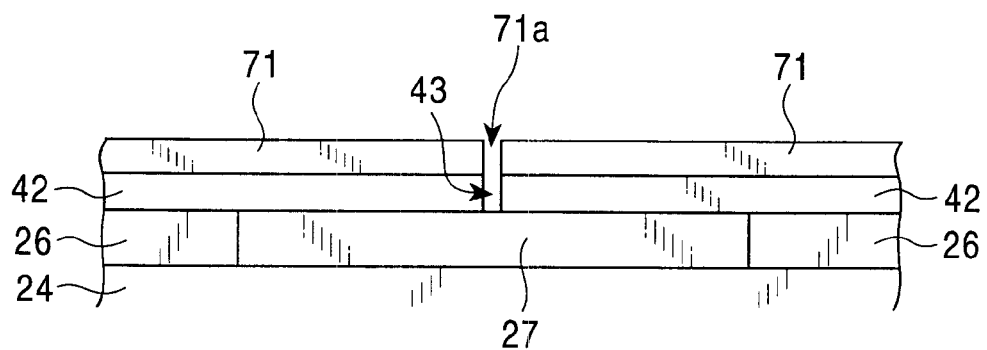
FIG. 10 is a front view of the thin-film magnetic head illustrating the method for manufacturing the thin-film magnetic head according to the first embodiment of the present invention.

Next, as shown in FIG. 10, the groove 43 is formed by the sequential steps of forming a mask layer 71 on the insulating layer 42, forming a pattern 71a in the mask layer 71 by a photolithographic technique, and performing an anisotropic etching of the insulating layer 42 exposed by the pattern 71a. As anisotropic etching, a reactive ion etching (RIE) can be preferably employed.

In the above process, the thickness of the mask layer 71 is preferably in the range from 0.5 $\mu$m to 2 $\mu$m, and is preferably composed of one of a photoresist layer, a metal film layer, a composite layer of a photoresist layer and a metal film layer, and a metal oxide layer.

In addition to common positive and negative photoresists, a photoresist which can be exposed by ultraviolet rays, electron beams, x-rays, ion beams, and the like, may be used. The metal film layer is preferably composed of one of Ti, Zr, Nb, Ta, Cr, Mo, W, Ru, Co, Rh, Ir, Ni, Pd, Pt, Au, Al, In, and Si, and may be formed in a single layer film or a multi-layered film. In addition, the metal oxide layer is preferably at least one of SiO, $SiO_2$, TaO, $Ta_2O_5$, TiO, SiN, $Si_3N_4$, Cro, wO, ZrO, NiO, AlO and IrO, and may be formed in a single layer film or a multi-layered film.

Reacting gas used for forming the groove 43 by the RIE method may be one of $CF_4$, a mixture of $CF_4$ and $O_2$, $C_2F_6$, a mixture of $C_2F_6$ and $O_2$, $C_4F_8$, a mixture of $C_4F_8$ and $O_2$, $Cl_2$, $BCl_3$, a mixture of $Cl_2$ and $BCl_3$, and $CHF_3$, and as well as mixtures thereof with Ar. Among these reacting gases, a suitable one is selected in accordance with the materials used for the insulating layer 42 and the mask layer 71.

Figure 11:
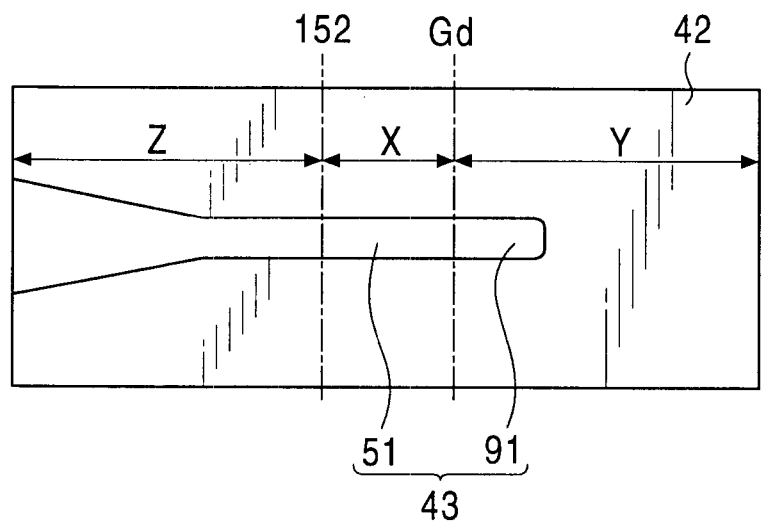
FIG. 11 is a plan view of the thin-film magnetic head illustrating the method for manufacturing the thin-film magnetic head according to the first embodiment of the present invention.
Figure 12:
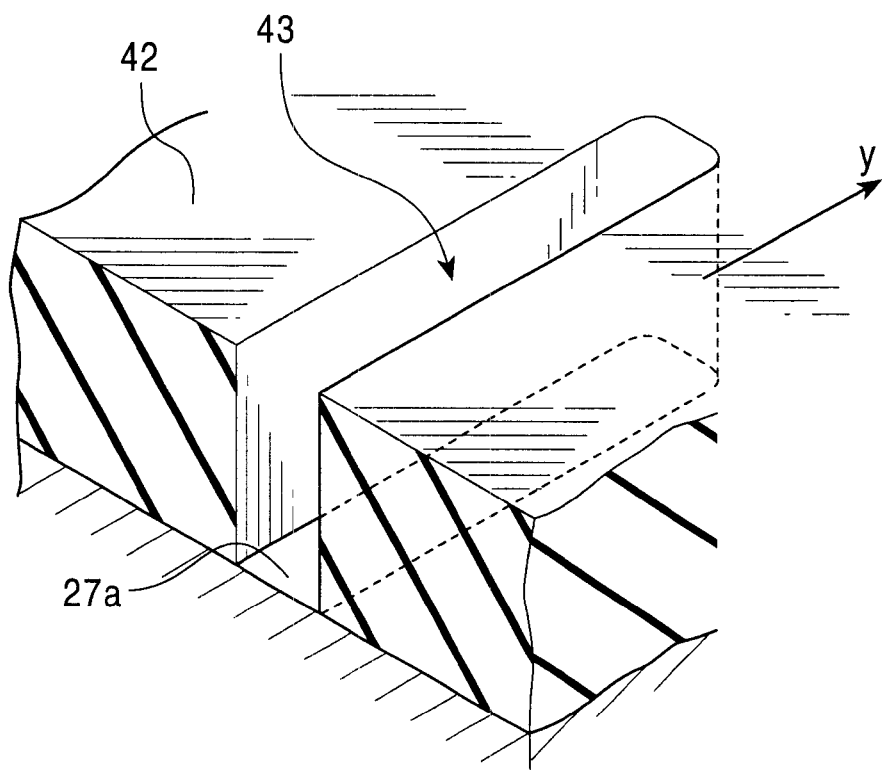
FIG. 12 is a perspective view of the groove of the thin-film magnetic head illustrating the method for manufacturing the thin-film magnetic head according to the first embodiment of the present invention.

The groove 43 thus formed continuously extends from the outside of the medium-opposing face 152 in the magnetic pole region X, indicated by Z in FIG. 11, toward the back region Y (direction y indicated by an arrow in FIG. 12) via the medium-opposing face 152 in the magnetic pole region X, the magnetic pole region X, and a part of the back region Y. The groove 43 is also formed so as to expose an upper surface 27a of the lower core layer 27 at the bottom of the groove.

The width of the groove body portion 51 is not more than 1 $\mu$m, and is preferably not more than 0.5 $\mu$m.

Figure 13:
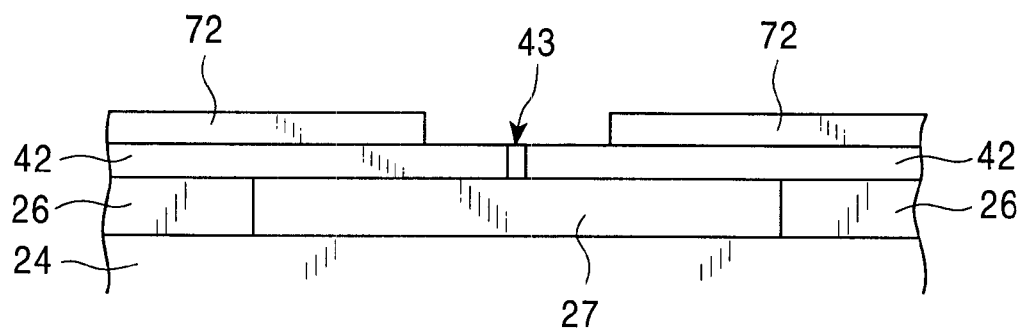
FIG. 13 is a front view of the thin-film magnetic head illustrating the method for manufacturing the thin-film magnetic head according to the first embodiment of the present invention.

As shown in FIG. 13, the mask layer 71 is removed, and then a protective layer 72 is formed. The protective layer 72 is formed so as to cover the insulating layer 42 except for the vicinity of the groove.

Figure 14:
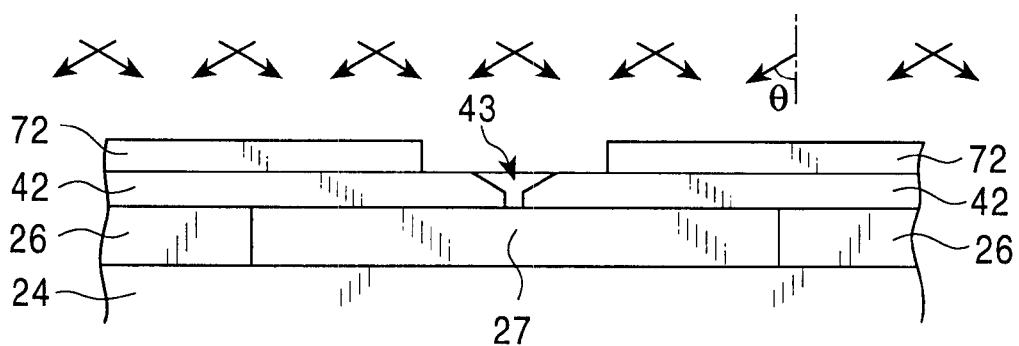
FIG. 14 is a front view of the thin-film magnetic head illustrating the method for manufacturing the thin-film magnetic head according to the first embodiment of the present invention.
Figure 15:
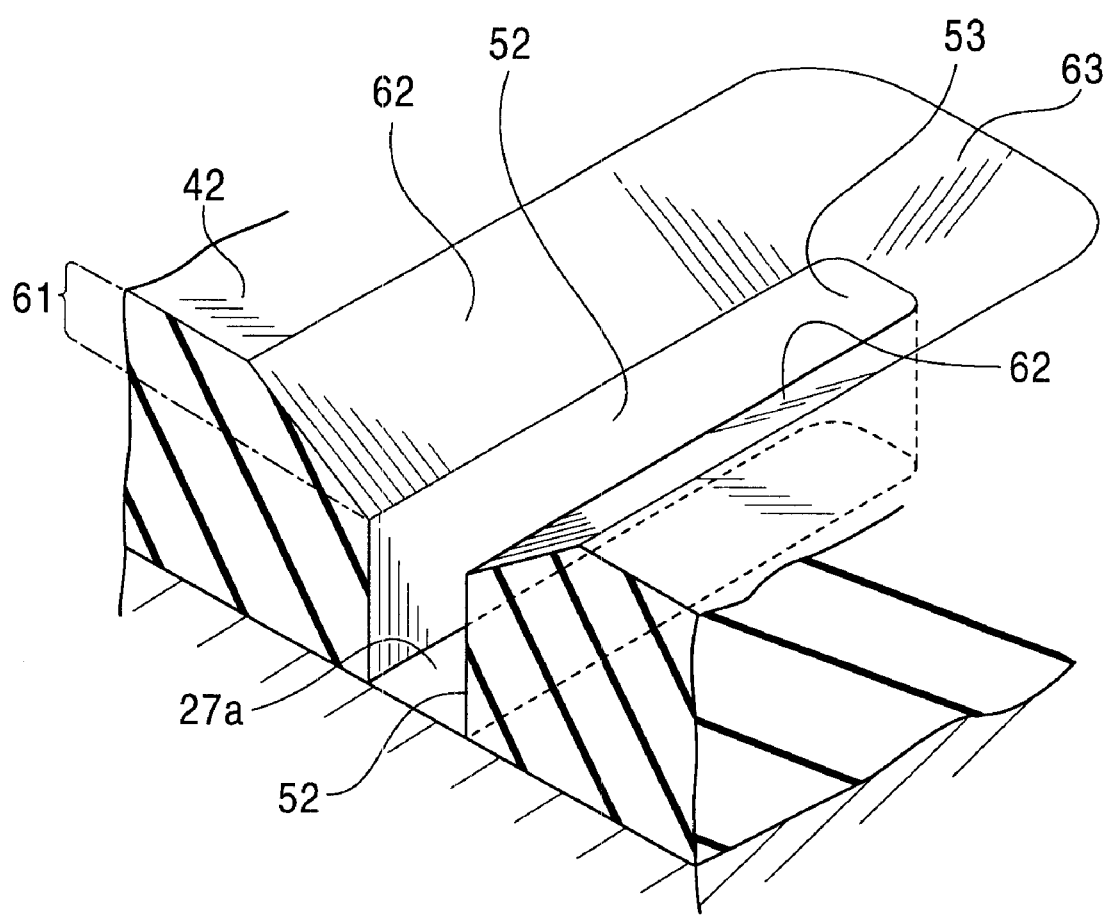
FIG. 15 is a perspective view of the thin-film magnetic head illustrating the method for manufacturing the thin-film magnetic head according to the first embodiment of the present invention.

Next, as shown in FIGS. 14 and 15, by etching the junction area between the upper surface of.the insulating layer 42 and the groove 43 using physical ion beam etching (ion milling with rare gases, such as Ar), the inclined side wall surfaces 62 and the end inclined surface 63, are formed.

An irradiation angle $\theta$ of ion beams for etching is preferably $30° \leq \theta \leq 70°$ to the vertical direction in FIG. 14 and etching is preferably performed while the slider is rotated.

The inclined side wall surfaces 62 and the end inclined surface 63 are formed to be inclined at predetermined angles to the upper surface 27a of the lower core layer 27 by a shadow effect caused by an interaction between the protective layer 72, formed on areas except for the vicinity of the groove 43, and ion beams.

Figure 16:
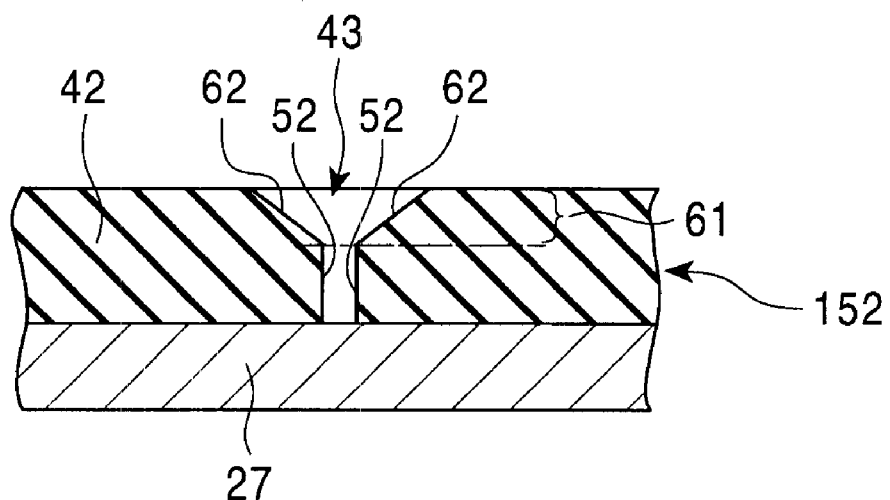
FIG. 16 is a cross-sectional front view of the thin-film magnetic head illustrating the method for manufacturing the thin-film magnetic head according to the first embodiment of the present invention.
Figure 17:
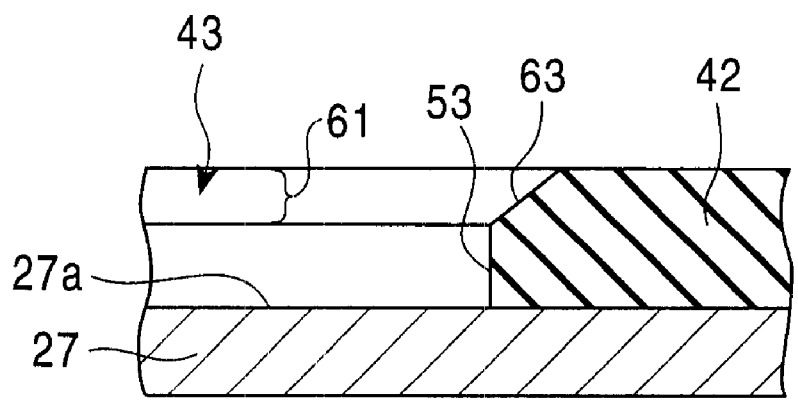
FIG. 17 is a cross-sectional side view of the hybrid thin-film magnetic head illustrating the method for manufacturing the hybrid thin-film magnetic head according to the first embodiment of the present invention.

Since the inclined side wall surfaces 62 and the end inclined surface 63 are thus formed, as shown in FIGS. 15, 16, and 17, the groove body portion 51 adjacent to the lower core layer 27 and the inclined portion 61 adjacent to the upper surface (upper core layer 47 side) of the insulating layer 42 are formed in the groove 43.

Figure 18:
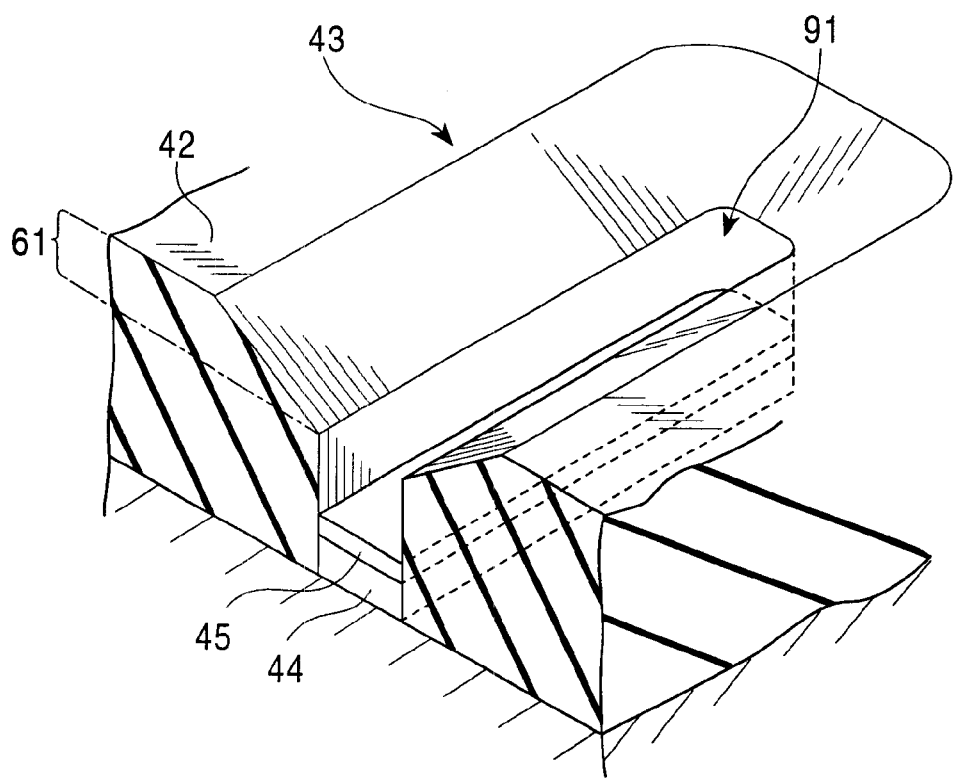
FIG. 18 is a perspective view of the thin-film magnetic head illustrating the method for manufacturing the thin-film magnetic head according to the first embodiment of the present invention.
Figure 19:
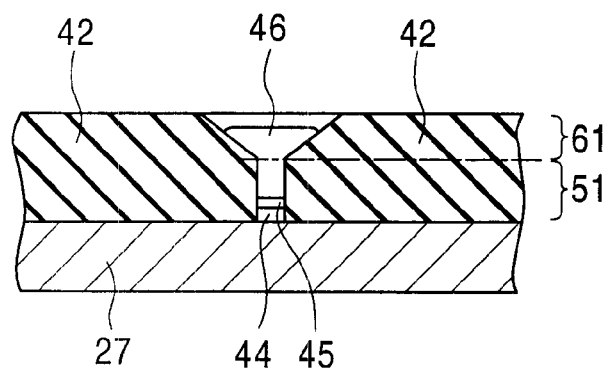
FIG. 19 is a cross-sectional front view of the thin-film magnetic head illustrating the method for manufacturing the thin-film magnetic head according to the first embodiment of the present invention.
Figure 20:
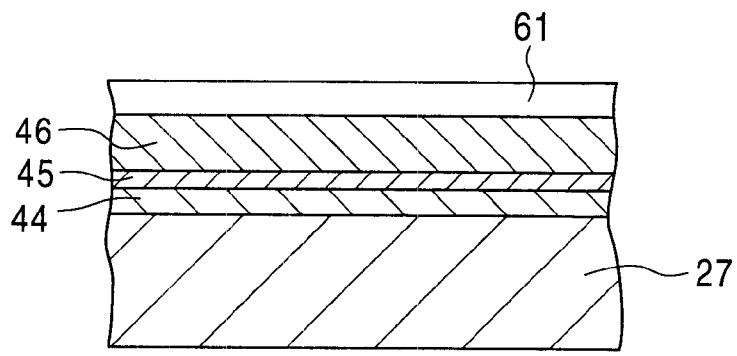
FIG. 20 is a cross-sectional side view of the thin-film magnetic head illustrating the method for manufacturing the thin-film magnetic head according to the first embodiment of the present invention.

Next, as shown in FIGS. 18, 19, and 20, in the groove 43, the lower magnetic pole layer 44 and the gap layer 45 are formed, and the upper magnetic pole layer 46 is then formed.

Formation of the layers 44, 45, and 46 is preferably performed by using electroplating, and specifically, it is preferable that the individual layers 44, 45, and 46 be sequentially formed by using the lower core layer 27 composed of a soft magnetic alloy as an electrode.

Since the upper surface 27a of the lower core layer 27 is exposed at the bottom of the groove 43 when the lower core layer 27 is nearly covered by the insulating layer 42, as shown in FIG. 17, the lower magnetic pole layer 44, the gap layer 45, and the upper magnetic pole layer 46 are formed only in the groove 43 by deposition on the lower core layer 27 thus exposed.

As shown in FIG. 18, in particular, the lower magnetic pole layer 44 and the gap layer 45 are sequentially formed on the upper surface 27a of the lower core layer 27 by electroplating. In this step, the lower magnetic pole layer 44 and the gap layer 45 are formed by adjusting the thickness thereof so as to be disposed in the groove body portion 51 and the groove-extending portion 91, and so as not to reach the inclined portion 61. The thickness of the lower magnetic pole layer 44 is from 0.1 μm to 0.5 μm, preferably from 0.1 μm to 0.3 μm, and more preferably 0.2 μm.

Next, as shown in FIGS. 19 and 20, the upper magnetic pole layer 46 is formed on the gap layer 45 by electroplating. In this step, the upper magnetic pole layer 46 is formed by adjusting the thickness thereof so as to be continuously disposed from the groove body portion 51 to the inclined portion 61. The thickness of the upper magnetic pole layer 46 is from 0.2 μm to 1.5 μm, and preferably 1.0 μm.

In FIGS. 19 and 20, the upper magnetic pole layer 46 is formed so as not to overflow from the groove 43. However, when a part of the upper magnetic pole layer 46 is disposed on the inclined portion 61, the upper surface of the upper magnetic pole layer 46 may be flush with the upper surface of the insulating layer 42, or the upper magnetic pole layer 46 may overflow from the groove 43.

When the lower magnetic pole layer 44, the gap layer 45, and the upper magnetic pole layer 46 are formed by electroplating, these layers 44, 45, and 46 must be composed of metal. When one of these layers is composed of an insulating material, continuous electroplating is difficult to perform due to the formation of an insulating layer.

In addition, the lower magnetic pole layer 44 and the upper magnetic pole layer 46 must be composed of a soft magnetic material, and the gap layer 45 must be composed of a non-magnetic material.

Accordingly, as preferable materials for the lower magnetic pole layer 44 and the upper magnetic pole layer 46, a FeNi alloy, a FeNi alloy in which Fe is richer than Ni, and a CoFeNi alloy may be considered as examples, and single layer films or multi-layered films thereof may be used. As a preferable material for the gap layer 45, at least one material of Au, Pt, Rh, Pd, Ru, Cr, a NiMo alloy, a NiW alloy, a NiP alloy, a NiPd alloy, and the like, may be considered as examples.

Figure 21:
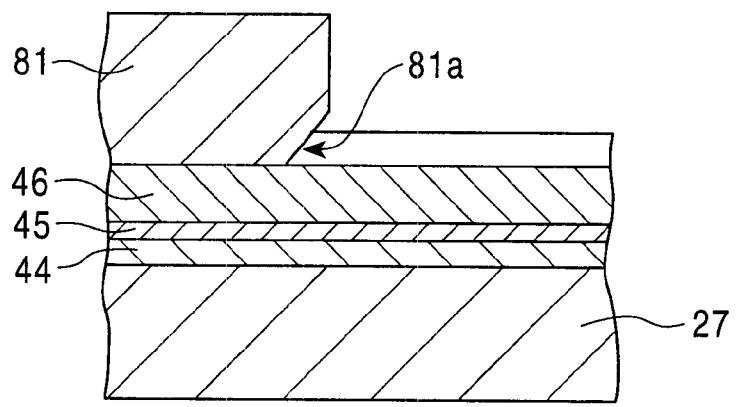
FIG. 21 is a cross-sectional side view of the thin-film magnetic head illustrating the method for manufacturing the thin-film magnetic head according to the first embodiment of the present invention.

As shown in FIG. 21, an upper mask layer 81 is formed on the upper magnetic pole layer 46. The upper mask layer 81 is formed by using a photolithographic technique so as to cover the groove 43 in the magnetic pole region X, and so as to have a recessed portion 81a at the lower side of the upper mask layer in a form which is excavated to the magnetic pole region X side at the boundary between the magnetic pole region X and the back region Y, in which a gap depth is to be formed. The form of the recessed portion 81a is used as a resist in a subsequent step of a lift-off method in the physical ion-beam etching.

The thickness of the upper mask layer 81 is in the range from 0.7 μm to 5.0 μm, and is preferably composed of a photoresist.

As a photoresist layer may be composed of, in addition to common positive and negative photoresists, a photoresist which can be exposed by ultraviolet rays, electron beams, x-rays, ion beams and the like.

Figure 22:
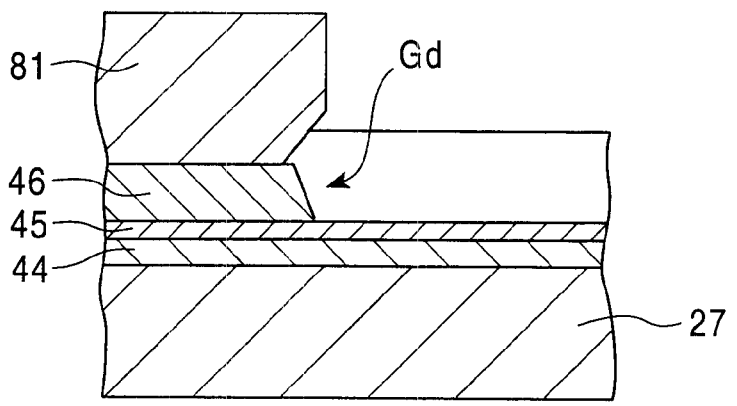
FIG. 22 is a cross-sectional side view of the thin-film magnetic head illustrating the method for manufacturing the thin-film magnetic head according to the first embodiment of the present invention.

As shown in FIG. 22, by etching the upper magnetic pole layer 46 in the back region Y using physical ion-beam etching (ion-milling by a rare gas, such as Ar), the upper magnetic pole layer 46 in the back region Y is removed, and the gap depth Gd is formed. Since the upper mask layer 81 is patterned by a lift-off method, the boundary portion between the magnetic pole region X and the back region Y is etched approximately in a vertical direction to the upper surface of the lower core layer 27, so that the gap depth Gd approximately parallel to the medium-opposing face 152 is formed at the end of the upper magnetic pole layer 46 in the magnetic pole region X.

The irradiation angle θ of ion beams for etching is preferably 0°≦θ≦45° to the vertical direction in the figures.

Figure 23:
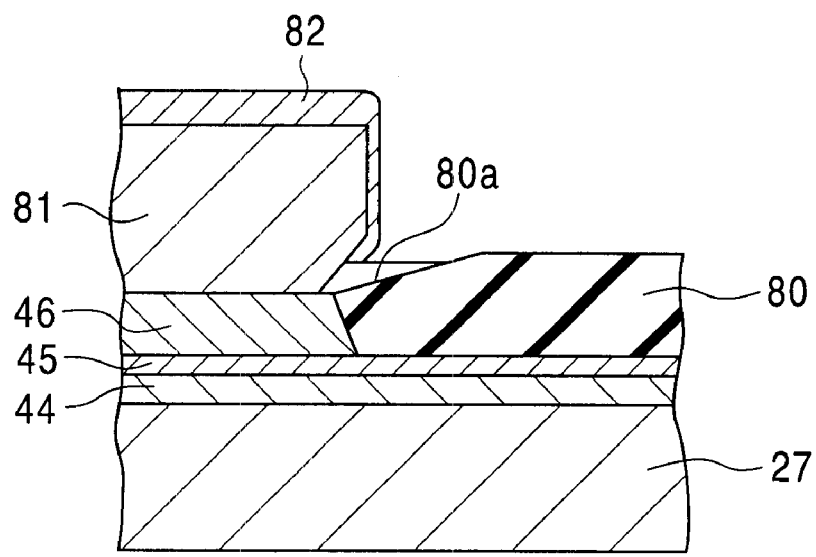
FIG. 23 is a cross-sectional side view of the thin-film magnetic head illustrating the method for manufacturing the thin-film magnetic head according to the first embodiment of the present invention.

As shown in FIG. 23, under a condition in which the upper mask layer 81 exists, the back insulating layer 80 is formed by sputtering. In this step, an anisotropic sputtering or ion-beam sputtering is preferably used.

In this step, due to the existence of the upper mask layer 81, an adduct layer 82 adheres to the upper part of the upper mask layer 81, and, at the boundary of the upper mask layer 81, an inclined surface to be the apex surface 80a at the boundary of the back insulating layer 80 can be formed as shown in FIG. 23.

Figure 24:
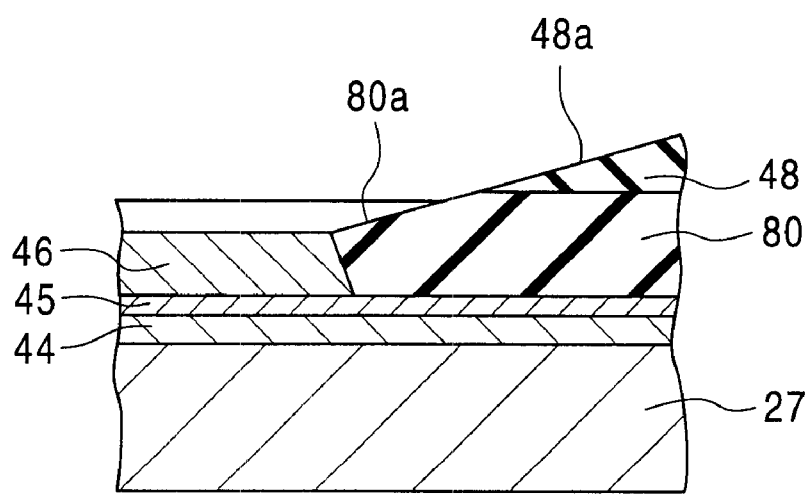
FIG. 24 is a cross-sectional side view of the thin-film magnetic head illustrating the method for manufacturing the thin-film magnetic head according to the first embodiment of the present invention.

Then, as shown in FIG. 24, the upper mask layer 81 is removed by using acetone, N-methyl pyrrolidone (NMP), and the like, and at the same time, the adduct layer 82 adhering to the upper mask layer 81 is removed.

Figure 25:
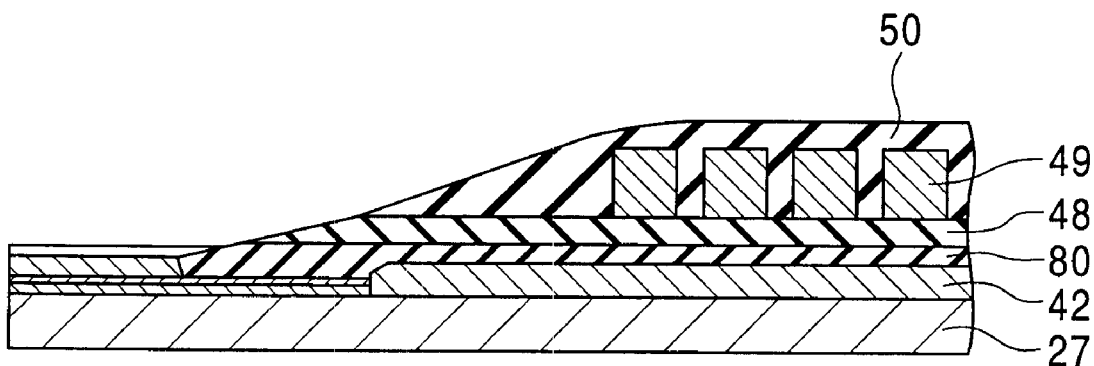
FIG. 25 is a cross-sectional side view of the thin-film magnetic head illustrating the method for manufacturing the thin-film magnetic head according to the first embodiment of the present invention.

Next, as shown in FIGS. 24 and 25, the coil-insulating layer 48 is formed on the back insulating layer 80. The coil-insulating layer 48 has the inclined surface 48a, inclining toward the apex surface 80a of the back insulating layer 80, at the upper surface thereof in the magnetic pole region X. The inclined angle of the inclined surface 48a is set in accordance with the apex surface 80a of the back insulating layer 80.

Meanwhile, the coil-insulating layer 48 may not be formed.

Next, as shown in FIG. 25, the coil 49 is formed on the coil-insulating layer 48, and the upper insulating layer 50 is formed so as to cover the coil 49.

Figure 26:
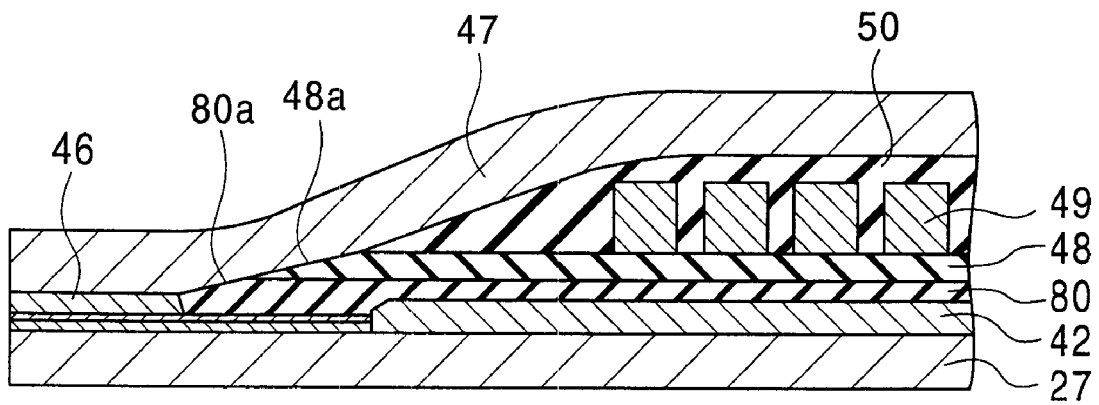
FIG. 26 is a cross-sectional side view of important portions of the thin-film magnetic head in the magnetic pole region illustrating the method for manufacturing the thin-film magnetic head according to the first embodiment of the present invention.

As shown in FIG. 26, the upper core layer 47, which covers the upper magnetic pole layer 46, the apex surface 80a of the back insulating layer 80, the inclined surface 48a of the coil insulating layer 48, and the upper insulating layer 50, is formed.

Figure 27:
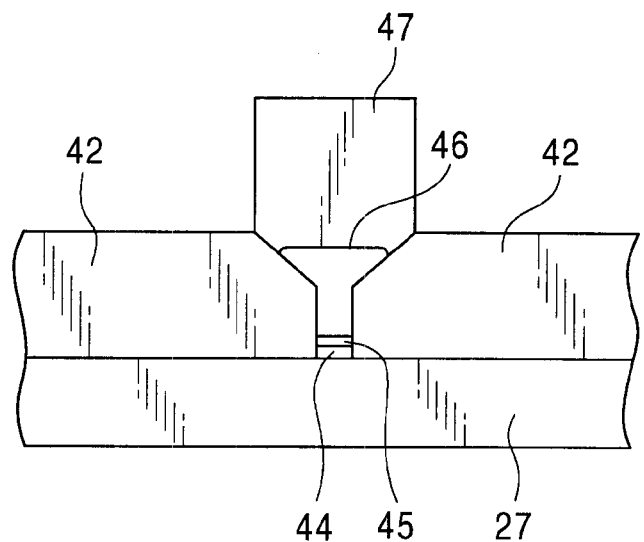
FIG. 27 is a front view of the thin-film magnetic head illustrating the method for manufacturing the thin-film magnetic head according to the first embodiment of the present invention.
Figure 28:
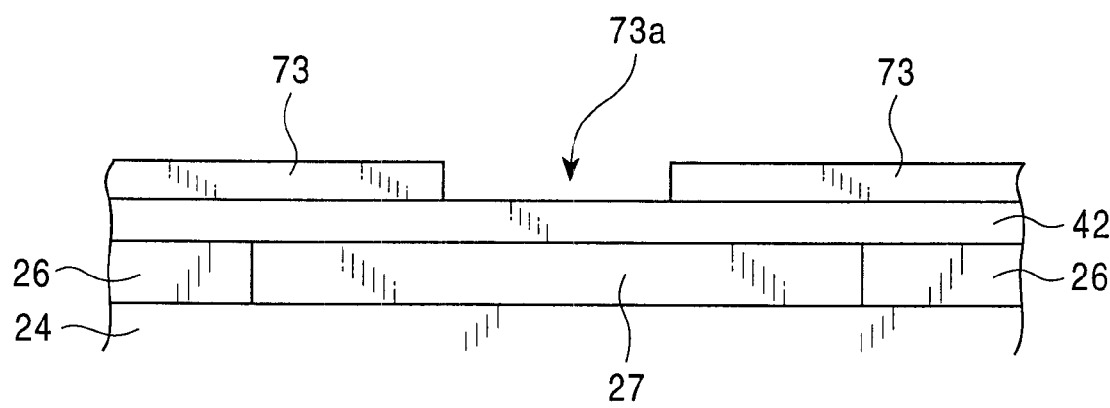
FIG. 28 is a front view of a thin-film magnetic head illustrating a method for manufacturing a thin-film magnetic head according to a second embodiment of the present invention.

As shown in FIG. 27, the upper core layer 47 preferably covers the entire upper magnetic pole layer 46, and is preferably disposed within the inclined portion 61 of the groove 43 in the width direction of the magnetic recording track. In a structure in which the upper surface of the upper magnetic pole layer 46 approximately coincides with the upper surface of the insulating layer 42, the upper core surface 47 is preferably formed so as to cover the entire upper magnetic pole layer 46.

Through a slicing step for slicing at the medium-opposing face 152 followed by a polishing step for polishing the medium-opposing face 152, the thin-film magnetic head according to the present invention is manufactured.

In the thin-film magnetic head 41 described above, the lower magnetic pole layer 44, the gap layer 45, the upper magnetic pole layer 46, and the back insulating layer 80 are formed in a layered structure in the groove 43 so as to form the magnetic gap, and the lower magnetic pole layer 44, the gap layer 45, and the upper magnetic pole layer 46 are exposed at the medium-opposing face 152. Consequently, the width of the magnetic recording track can be reduced when the width thereof agrees with that of the groove 43 at the medium-opposing face 152, and magnetic recording on the magnetic recording medium can be effectively performed by a leakage magnetic field generated from the magnetic gap.

The gap depth of the magnetic gap is determined by the distance from the medium-opposing face 152 to the end of the upper magnetic pole layer 46 at the back region Y side, and in addition, after forming the groove 43, the position and the form of the end of the upper magnetic pole layer 46 composing the magnetic gap can be determined by etching the upper mask layer 81. Consequently, determination of the gap depth made by the end face 53 having the rounded connecting portion for connecting the parallel side walls 52 of the groove 43, which end face 53 may cause variations, can be avoided, and the setting of the gap depth may not vary.

In the thin-film magnetic head 41 described above, since the upper magnetic pole layer 46 is formed in the groove body portion 51 and up to the inclined portion 61, and is contacted to the upper core layer 47, the tapered portion 46a of the upper magnetic pole layer 46 is formed at the upper core layer 47 side. Consequently, due to the existence of the tapered portion 46a, the flow of magnetic flux between the upper core layer 47 and the upper magnetic pole layer 46 becomes smoother, and the leakage magnetic flux at the junction area between the upper core layer 47 and the upper magnetic pole layer 46 to an unwanted areas can therefore be avoided.

Similarly to above, in the thin-film magnetic head 41 described above, since the apex surface 80a and the inclined surface 48a are formed on the back insulating layer 80 and the coil-insulating layer 48, respectively, and, due to the existence of the apex surface 80a and the inclined surface 48a, the flow of magnetic flux between the upper core layer 47 and the upper magnetic pole layer 46 becomes smoother, and the leakage magnetic flux at the junction area between the upper core layer 47 and the upper magnetic pole layer 46 to an unwanted areas can therefore be avoided.

Since the width of the groove body portion 51 is not more than 1 μm, and preferably not more than 0.5 μm, the width of the magnetic recording track can be not more than 1 μm.

When the upper mask layer 81 is removed, the adduct layer 82 adhering to the upper mask layer 81 as a so-called lift-off resist is simultaneously removed, the process can be simplified, and control of the environment for manufacturing the thin-film magnetic head can be facilitated.

A second embodiment of the thin-film magnetic head of the present invention and a manufacturing method therefor will be described with reference to the drawings.

FIGS. 28 to 31 are plan views of the thin-film magnetic head illustrating a manufacturing method therefor according to the embodiment.

The same reference labels of the constituent elements shown in FIGS. 1 to 27 in the first embodiment designate the same elements in FIGS. 28 to 31, and a description thereof will be omitted.

In this embodiment, an insulating layer 42 is formed similarly to that in the first embodiment shown in FIG. 9, and a mask layer 73 is then formed on the insulating layer 42.

In this step, a pattern 73a is formed in the mask layer 73 by using a photolithographic technique, and a groove 43 is then formed by performing reactive ion etching (RIE) of the insulating layer 42 exposed by the pattern 73a.

The thickness of the mask layer 73 is set to be from 0.5 μm to 4 μm, the thickness being determined by an etching rate of the mask layer 73 by RIE and the thickness being capable of forming the width of the pattern to be used as a magnetic recording track. The width of the pattern 73a is preferably not more than 2.0 μm when the width of the magnetic recording track is not more than 0.5 μm. A material for the mask layer 73 is selected from a material having an etching rate approximately equivalent to that of the insulating layer 42, for example, a photoresist is preferable. A photoresist layer may be composed of, in addition to common positive and negative photoresists, a photoresist that can be exposed by ultraviolet rays, electron beams, x-rays, ion beams, and the like.

Figure 29:
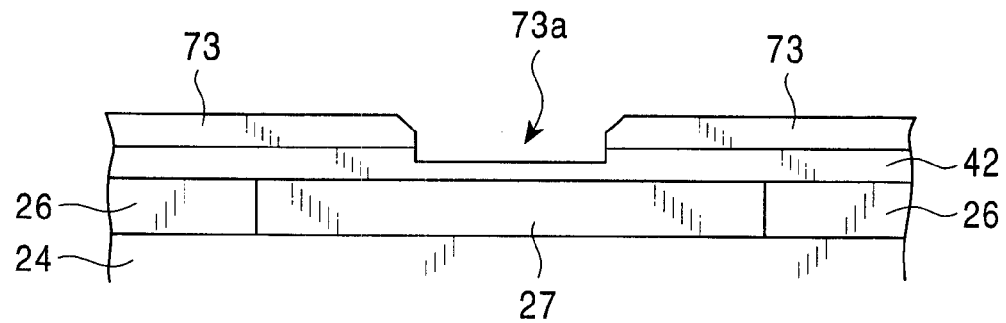
FIG. 29 is a front view of the thin-film magnetic head illustrating the method for manufacturing the thin-film magnetic head according to the second embodiment of the present invention.

As shown in FIG. 29, by performing RIE of the insulating layer 42 exposed by the pattern 73a formed on the mask layer 73, in which the RIE has less an anisotropic characteristic than that in the first embodiment and has a nearly isotropic characteristic, the insulating layer 42 under the pattern 73a and an angular portion of the pattern 73a of the mask layer 73 are etched.

Figure 30:
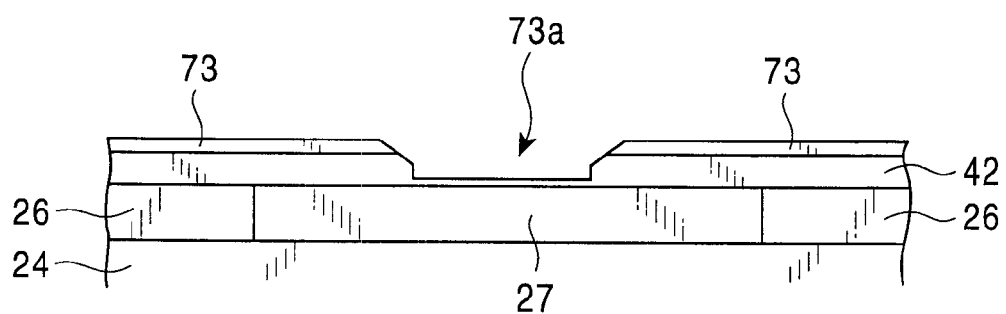
FIG. 30 is a front view of the thin-film magnetic head illustrating the method for manufacturing the thin-film magnetic head according to the second embodiment of the present invention.
Figure 31:
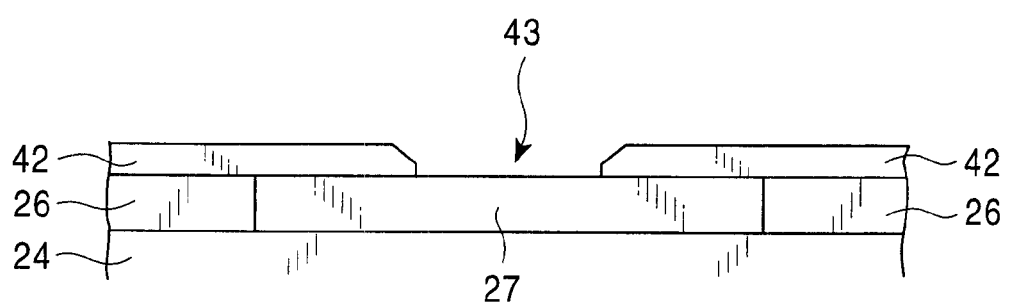
FIG. 31 is a front view of the thin-film magnetic head illustrating the method for manufacturing the thin-film magnetic head according to the second embodiment of the present invention.

After forming inclined surfaces having predetermined angles at the angular portion of the pattern 73a, the RIE again having an anisotropic characteristic is performed, whereby the mask layer 73 and the insulating layer 42 exposed by the pattern 73a are simultaneously etched, as shown in FIG. 30, and the groove 43 is then formed as shown in FIG. 31.

Then, by performing steps similar to those described in the first embodiment, an inductive head 41 is manufactured.

According to the embodiment, by controlling the RIE conditions in a stepwise manner, such as forming the inclined surface of the pattern 73a with less anisotropic characteristic than that in the first embodiment, and etching the mask layer 73 and the insulating layer 42 with an anisotropic characteristic, etching of the groove 43 and stripping (removing) of the mask layer 73 can be simultaneously performed. In addition, since the environment around the magnetic head is not significantly changed through these steps, formability of each layer, controllability of the film thickness, and reproducibility can be improved, the number of manufacturing steps, such as control conditions for the reactive gases, can be reduced, and workability can be improved, whereby superior productivity can be achieved.

A third embodiment of the thin-film magnetic head of the present invention and a manufacturing method therefor will be described with reference to the drawings.

Figure 32:
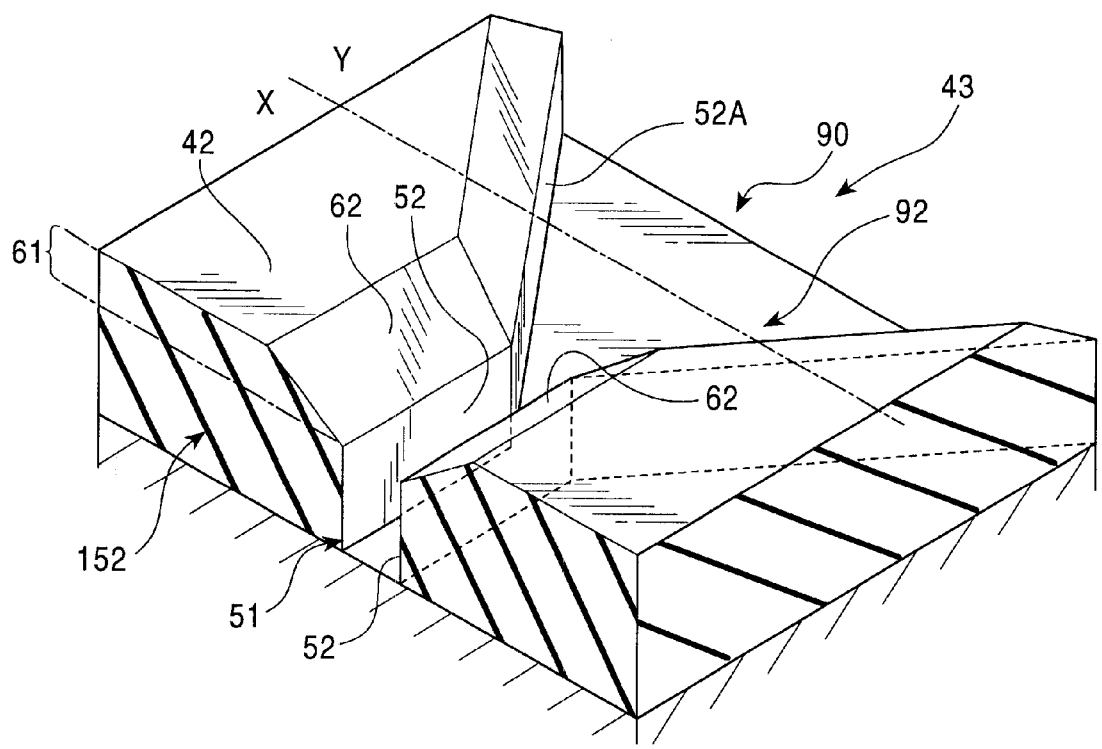
FIG. 32 is a perspective view of a groove of a thin-film magnetic head according to a third embodiment of the present invention.
Figure 33:
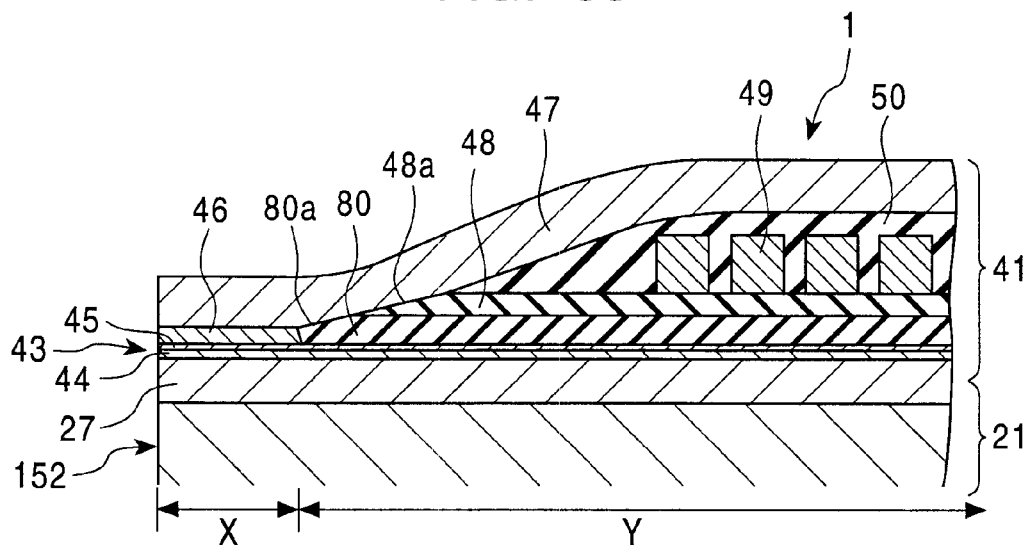
FIG. 33 is a cross-sectional side view of the thin-film magnetic head according to the third embodiment of the present invention.
Figure 34:
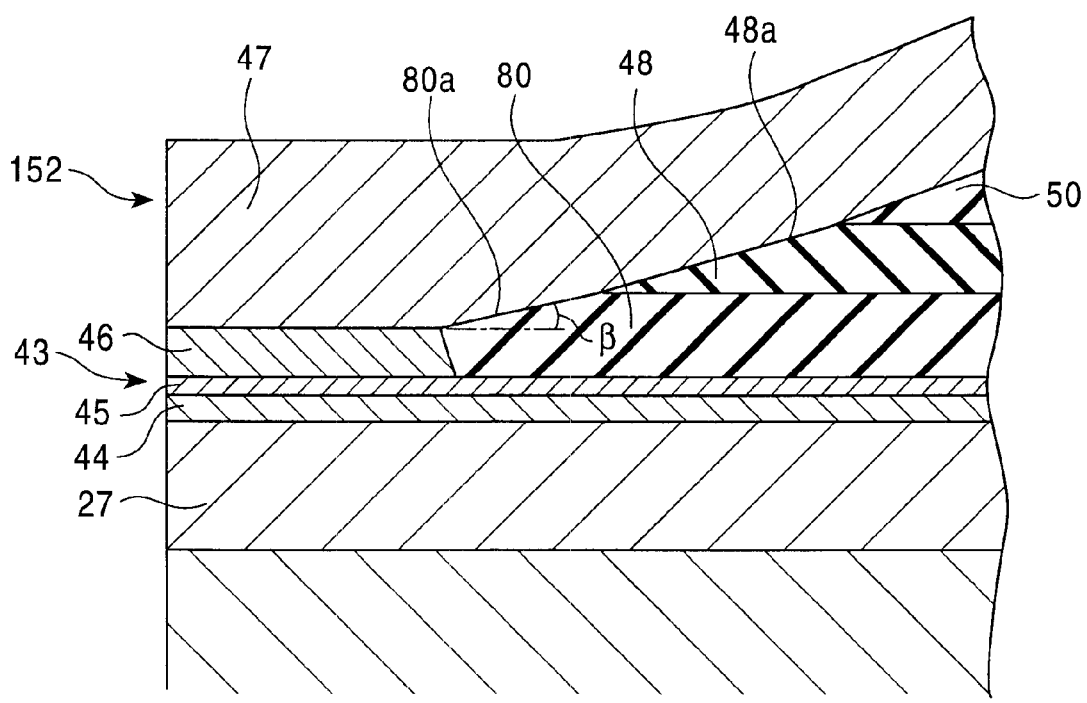
FIG. 34 is a cross-sectional side view of important portions of the thin-film magnetic head in a magnetic pole region according to the third embodiment of the present invention.

FIG. 32 is a perspective view showing a groove of a thin-film magnetic head of the embodiment, FIG. 33 is a side view of the thin-film magnetic head, and FIG. 34 is a side view of the thin-film magnetic head.

The same reference labels of the constituent elements shown in FIGS. 1 to 27 in the first embodiment designate the same elements in FIGS. 32 to 34, and a description thereof will be omitted.

In this embodiment, as shown in FIGS. 32 to 34, a groove 43 is composed of a groove body portion 51 and a groove-continuing portion 90 that continuously extends in a back region Y from the groove body portion 51 and that is adjacent to a lower core layer 27. The groove body portion 51 and the groove-continuing portion 90 are provided with an inclined portion 61 at an upper core layer 47 side.

As shown in FIG. 32, the groove-continuing portion 90 is connected to the groove body portion 51 at the back region Y side and has a groove-expanding portion 92 in which the width thereof in the width direction of the upper core layer 47 broadens toward the back region Y side.

The groove body portion 51 is provided with two vertical parallel side walls 52, which are formed on a lower core layer 27 and are approximately parallel to each other, extending to a medium-opposing face 152, and expanding side walls 52A which continue from the parallel side walls 52 and of which the distance therebetween expands. The groove-expanding portion 92 is also provided with the expanding side walls 52A.

Inclined portion 61 is provided with two inclined side walls surfaces 62 which are connected to the parallel side walls 52 and which incline toward the outer sides of the width of the groove-expanding portion 92.

A lower magnetic pole layer 44 and a gap layer 45 are disposed in the groove body portion 51 and the groove-expanding portion 92, and are continuously extended to the position under a coil 49, at which the lower magnetic pole layer 44 is connected to the lower core layer 27.

An upper magnetic pole layer 46 is formed in the groove body portion 51, and continues to the inclined portion 61, and is connected to an upper core layer 47, in which a gap depth is determined by the end of the upper magnetic pole layer 46 at the back region Y side.

As shown in FIGS. 33 and 34, a back insulating layer 80 and a coil insulating layer 48 are formed on the gap layer 45 at the back region Y side in the groove-expanding portion 92, in which the back insulating layer 80 has an apex surface 80a inclining so as to increase the thickness of the back insulating layer 80 from the medium-opposing face 152 toward the back region Y side, and the coil insulating layer 48 has an inclined surface 48a inclining toward the apex surface 80a.

An insulating layer 42, the lower magnetic pole layer 44, the gap layer 45, and the upper magnetic pole layer 46, are exposed at the medium-opposing face 152.

By the structure thus formed, similarly to those in the first embodiment, the width of the magnetic recording track at the medium-opposing face 152 agrees with that of the groove 43, and hence, the width of the magnetic recording track can be reduced. In addition, since the magnetic gap is exposed at the medium-opposing face 152, magnetic recording can be effectively performed on magnetic recording media by a leakage magnetic field generated from the magnetic gap.

Furthermore, in the case in which the lower magnetic pole layer 44 and the gap layer 45 are formed, an area for electroplating is enlarged compared to those in the first embodiment, and the flow of a plating liquid over the groove body portion 51 in electroplating therefore becomes more effectively. Consequently, controllability of film thickness and reproducibility of the lower magnetic pole layer 44 and the gap layer 45 in electroplating is improved. Accordingly, the precision of the thickness of these layers 44 and 45 is improved, and stabilization of magnetic recording characteristics in the writing head 41 can be achieved.

Figure 35:
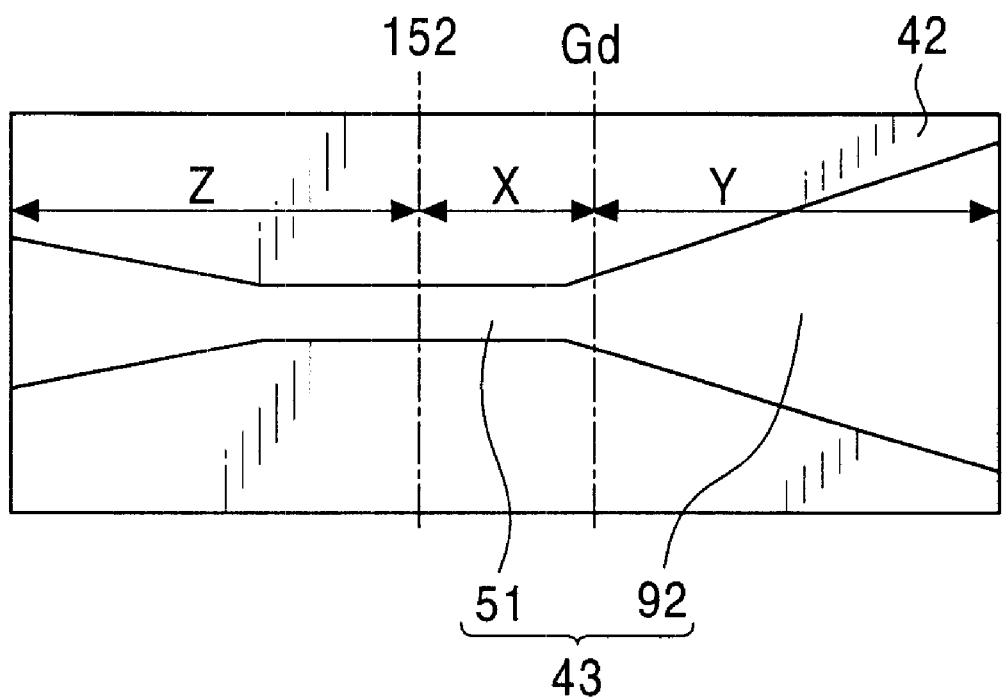
FIG. 35 is a plan view of the thin-film magnetic head illustrating a method for manufacturing the thin-film magnetic head according to the third embodiment of the present invention.

As shown in FIG. 35, in the thin-film magnetic head according to the embodiment, the groove 43 is formed to be disposed at the outside of the medium-opposing face 152 in the magnetic pole region X, indicated by Z, at the magnetic pole region X, and at a part of the back region extending from the medium-opposing face 152 toward the back region Y. In addition, the upper surface of the lower core layer 27 is formed so as to be exposed at the bottom of the groove 43. The width of the groove body portion 51 is not more than 1 $\mu$m, and more preferably not more than 0.5 $\mu$m, and the groove-expanding portion 92 is set so as to expand the width thereof toward the back region Y.

In the thin-film magnetic head 41 described above, since the lower magnetic pole layer 44, the gap layer 45, the upper magnetic pole layer 46, and the back insulating layer 80 are formed in the groove 43 so as to form the magnetic gap, and the lower magnetic pole layer 44, the gap layer 45, and the upper magnetic layer 46 are exposed at the medium-opposing face 152, the width of the magnetic recording track agrees with the width of the groove 43 at the medium-opposing face 152, and the width of the magnetic recording track can therefore be reduced. In addition, magnetic recording on the magnetic recording medium can be effectively performed by a leakage magnetic field generated from the magnetic gap.

Since a gap depth of the magnetic gap is set by the distance from the medium-opposing face 152 to the end of the upper magnetic pole layer 46 at the back region Y side, and, after forming the groove 43, the position and the form of the end of the upper magnetic pole layer 46 composing the magnetic gap can be re-set by etching the upper mask layer 81, the gap depth is not set by the end face 53 of the groove 43, which end face 53 may vary, and hence, the setting of the gap depth may not vary.

In the thin-film magnetic head 41 described above, since the upper magnetic pole layer 46 is formed in the groove body portion 51 and to the inclined portion 61, and is contacted with the upper core layer 47, the tapered portion 46a of the upper magnetic pole layer 46 is formed at the upper core layer 47 side. Consequently, due to the existence of the tapered portion 46a, the flow of magnetic flux between the upper core layer 47 and the upper magnetic pole layer 46 becomes smoother, and the leakage magnetic flux at the junction area between the upper core layer 47 and the upper magnetic pole layer 46 can therefore be avoided.

Similarly to above, in the thin-film magnetic head 41 described above, since the apex surface 80a and the inclined surface 48a are formed on the back insulating layer 80 and the coil-insulating layer 48, respectively, and, due to the existence of the apex surface 80a and the inclined surface 48a, the flow of magnetic flux between the upper core layer 47 and the upper magnetic pole layer 46 becomes smoother, and the leakage magnetic flux at the junction area between the upper core layer 47 and the upper magnetic pole layer 46 can therefore be avoided.

Since the width of the groove body portion 51 is set to be not more than 1 $\mu$m, and preferably not more than 0.5 $\mu$m, the width of the magnetic recording track can be not more than 1 $\mu$m.

What is claimed is:

1. A thin-film magnetic head having a structure comprising: an upper core layer; a lower core layer; a coil; and a gap layer, the upper core layer and the lower core layer extending from a back region toward a magnetic pole region, ends of the upper core layer and the lower core layer being exposed at a medium-opposing face, the upper core layer and the lower core layer being coupled to each other at a coupling portion in the back region, the coil being disposed near the coupling portion between the upper core layer and the lower core layer, the gap layer being disposed in the magnetic pole region between the upper core layer and the lower core layer;

wherein an insulating layer is formed on the lower core layer, a back insulating layer is formed on the gap layer in the back region, a groove is formed in the insulating layer so as to extend from the medium-opposing face in the magnetic pole region toward the back region, a lower magnetic pole layer, the gap layer, and an upper magnetic pole layer are formed in the groove, the lower magnetic pole layer being connected to the lower core layer, the upper magnetic pole layer being connected to the upper core layer, the upper magnetic pole layer composing a upper magnetic pole, the lower magnetic pole layer composing a lower magnetic pole, and the groove comprises openings at the lower core layer side, the upper core layer side, and the medium-opposing face side, a groove body portion having a cross-sectional size approximately equivalent to the opening at the medium-opposing face and extending at least in a part of the magnetic pole region, and a groove-continuing portion continuing from the groove body portion and extending in the back region.

2. A thin-film magnetic head according to claim 1, wherein a coil-insulating layer is formed on the back insulating layer.

3. A thin-film magnetic head according to claim 2, wherein the coil-insulating layer comprises an inclined surface inclining toward an apex surface of the back insulating layer.

4. A thin-film magnetic head according to claim 1, wherein the groove-continuing portion comprises a groove-extending portion which has a cross-sectional size approximately equivalent to that of the groove body portion and which extends in the back region.

5. A thin-film magnetic head according to claim 1, wherein the groove comprises an inclined portion at the upper core layer side, the inclined portion has an inclined side wall surface inclining outward in a width direction of the groove body portion, and the upper magnetic pole layer has a tapered portion corresponding to the inclined side wall surface.

6. A thin-film magnetic head according to claim 1, wherein the back insulating layer comprises an inclined apex surface so as to increase a thickness of the back insulating layer from the medium-opposing face side toward the back region.

7. A thin-film magnetic head according to claim 1, wherein a length of the upper magnetic pole layer from the medium-opposing face is set to be not less than a width of the upper magnetic pole layer.

8. A thin-film magnetic head according to claim 1, wherein a width of the groove body portion is set to be not more than 1 $\mu$m.

9. A hybrid thin-film magnetic head comprising:

a reading magnetic head having a magnetoresistive element; and a thin-film magnetic head according to claim 1, wherein the reading magnetic head and the thin-film magnetic head are in a stacked structure.

10. A thin-film magnetic head having a structure comprising: an upper core layer; a lower core layer; a coil; and a gap layer, the upper core layer and the lower core layer extending from a back region toward a magnetic pole region, ends of the upper core layer and the lower core layer being exposed at a medium-opposing face, the upper core layer and the lower core layer being coupled to each other at a coupling portion in the back region, the coil being disposed near the coupling portion between the upper core layer and the lower core layer, the gap layer being disposed in the magnetic pole region between the upper core layer and the lower core layer;

wherein an insulating layer is formed on the lower core layer, a groove is formed in the insulating layer so as to extend from the medium-opposing face in the magnetic pole region toward the back region, a lower magnetic pole layer, the gap layer, and an upper magnetic pole layer are formed in the groove, the lower magnetic pole layer being connected to the lower core layer, the upper magnetic pole layer being connected to the upper core layer, the upper magnetic pole layer composing a upper magnetic pole, the lower magnetic pole layer composing a lower magnetic pole, the groove comprises openings at the lower core layer side, the upper core layer side, and the medium-opposing face side, a groove body portion having a cross-sectional size approximately equivalent to the opening at the medium-opposing face and extending at least in a part of the magnetic pole region, and a groove-continuing portion continuing from the groove body portion and extending in the back region, and wherein the groove-continuing portion comprises a groove-expanding portion which is connected to the groove body portion at the back region side and which expands a width of the groove-expanding portion in a width direction of the lower core layer toward the back region.

11. A thin-film magnetic head according to claim 10, wherein a back insulating layer is formed on the gap layer in the back region.

12. A thin-film magnetic head according to claim 11, wherein a coil-insulating layer is formed on the back insulating layer.

13. A thin-film magnetic head according to claim 12, wherein the coil-insulating layer comprises an inclined surface inclining toward an apex surface of the back insulating layer.

14. A thin-film magnetic head according to claim 11, wherein the back insulating layer comprises an inclined apex surface so as to increase a thickness of the back insulating layer from the medium-opposing face side toward the back region.

15. A thin-film magnetic head according to claim 10, wherein the groove-continuing portion comprises a groove-extending portion which has a cross-sectional size approximately equivalent to that of the groove body portion and which extends in the back region.

16. A thin-film magnetic head according to claim 10, wherein the groove comprises an inclined portion at the upper core layer side, the inclined portion has an inclined side wall surface inclining outward in a width direction of the groove body portion, and the upper magnetic pole layer has a tapered portion corresponding to the inclined side wall surface.

17. A thin-film magnetic head according to claim 10, wherein a length of the upper magnetic pole layer from the medium-opposing face is set to be not less than a width of the upper magnetic pole layer.

18. A thin-film magnetic head according to claim 10, wherein a width of the groove body portion is set to be not more than 1 $\mu$m.

19. A hybrid thin-film magnetic head comprising:

a reading magnetic head having a magnetoresistive element; and a thin-film magnetic head according to claim 10, wherein the reading magnetic head and the thin-film magnetic head are in a stacked structure.

* * * * *